United States Patent
Manabe et al.

(10) Patent No.: US 6,254,289 B1
(45) Date of Patent: Jul. 3, 2001

(54) LENS COVER APPARATUS FOR CAMERA

(75) Inventors: Mitsuo Manabe; Kazuaki Nagata; Hideo Kobayashi, all of Omiya (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 09/409,077

(22) Filed: Sep. 30, 1999

(30) Foreign Application Priority Data

| Sep. 30, 1998 | (JP) | 10-277937 |
| Sep. 30, 1998 | (JP) | 10-278015 |
| Sep. 30, 1998 | (JP) | 10-278016 |
| Sep. 30, 1998 | (JP) | 10-278017 |

(51) Int. Cl.$^7$ ............................................. G03B 17/00
(52) U.S. Cl. ........................................................ 396/448
(58) Field of Search ................................. 396/448, 379, 396/84

(56) References Cited

U.S. PATENT DOCUMENTS

| 4,283,132 |   | 8/1981 | Engelsmann et al. | 396/448 |
| 4,681,418 | * | 7/1987 | Kodaira | 396/448 |
| 4,876,563 | * | 10/1989 | Ishida et al. | 396/448 |
| 5,617,167 | * | 4/1997 | Kaji | 396/448 |
| 5,754,906 | * | 5/1998 | Yoshida | 396/448 |
| 5,913,089 | * | 6/1999 | Ebe | 396/448 |

FOREIGN PATENT DOCUMENTS 63-021632 * 1/1988 (JP) ............................ G03B/11/00
2-252829    10/1990 (JP).

* cited by examiner

Primary Examiner—W. B. Perkey
(74) Attorney, Agent, or Firm—Nixon Peabody LLP; David S. Safran

(57) ABSTRACT

A pivot of a lens cover provided between a camera body and a casing is arranged in a space enclosed by a film cartridge chamber, a fixed cylinder of a lens barrel and a finder in the camera body. The front of the film cartridge chamber is thus utilized as a recessed space for the lens cover. Projecting parts are formed on the peripheral surface of the fixed cylinder, and chips are formed at the inner circumference of a drive ring, which is rotatably arranged on the peripheral surface of the fixed cylinder and transmits a rotational force of the motor to the lens cover. The drive ring is mounted on the fixed cylinder with the chips being joined with the projecting parts, and is rotated by a predetermined amount so that the projecting parts can prevent the drive ring from coming off. This eliminates the necessity of adding a member for preventing the drive ring from coming off. A power transmission mechanism in the lens cover driving mechanism is arranged in a conventionally-unused recession between the fixed cylinder and the film cartridge chamber. A cam member for moving the movable lens holding frames of the zoom finder is connected to the lens cover. The lens cover is opened and closed by a driving force of the cam member. This eliminates the necessity of providing a special mechanism for driving the lens cover. One motor drives the lens cover and the movable lens holding frames of the zoom finder.

13 Claims, 23 Drawing Sheets

F I G. 2
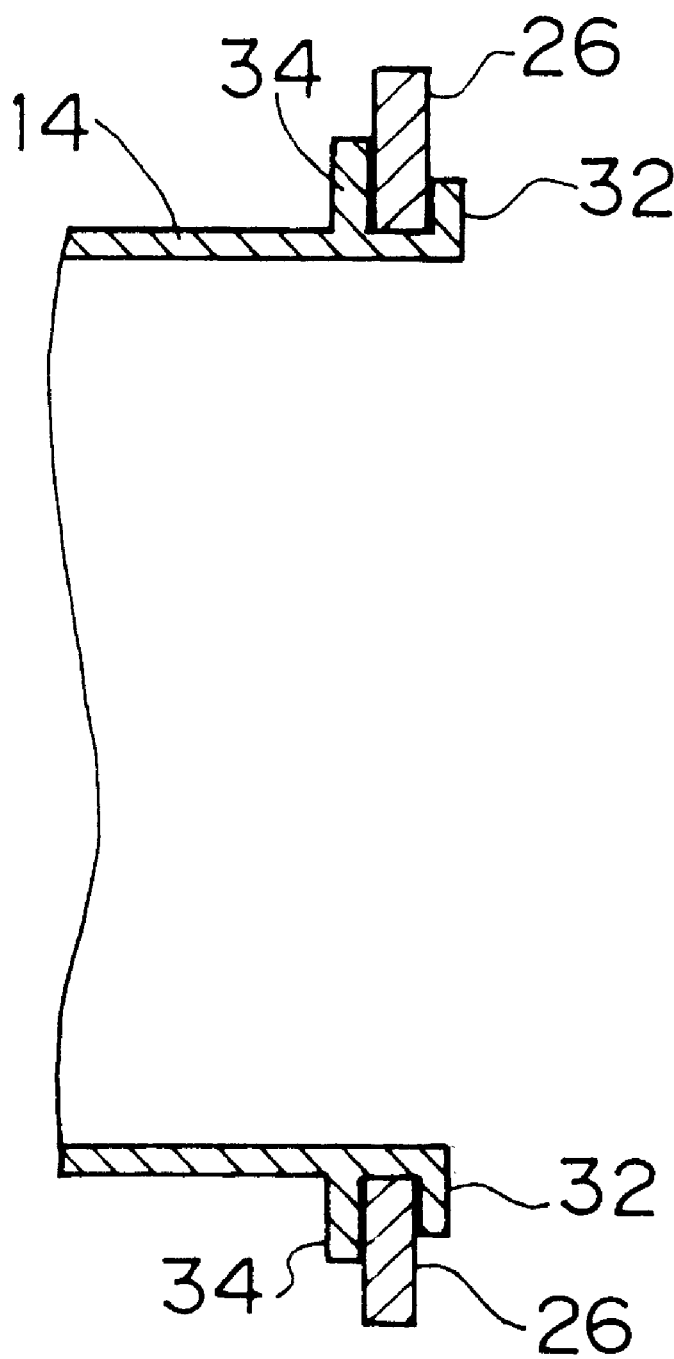

F I G. 7
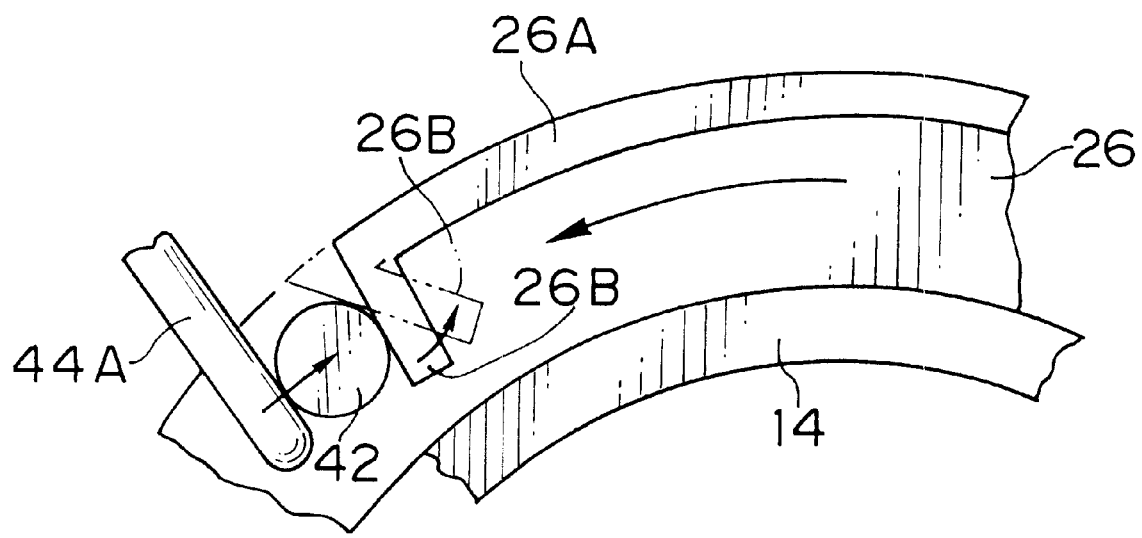

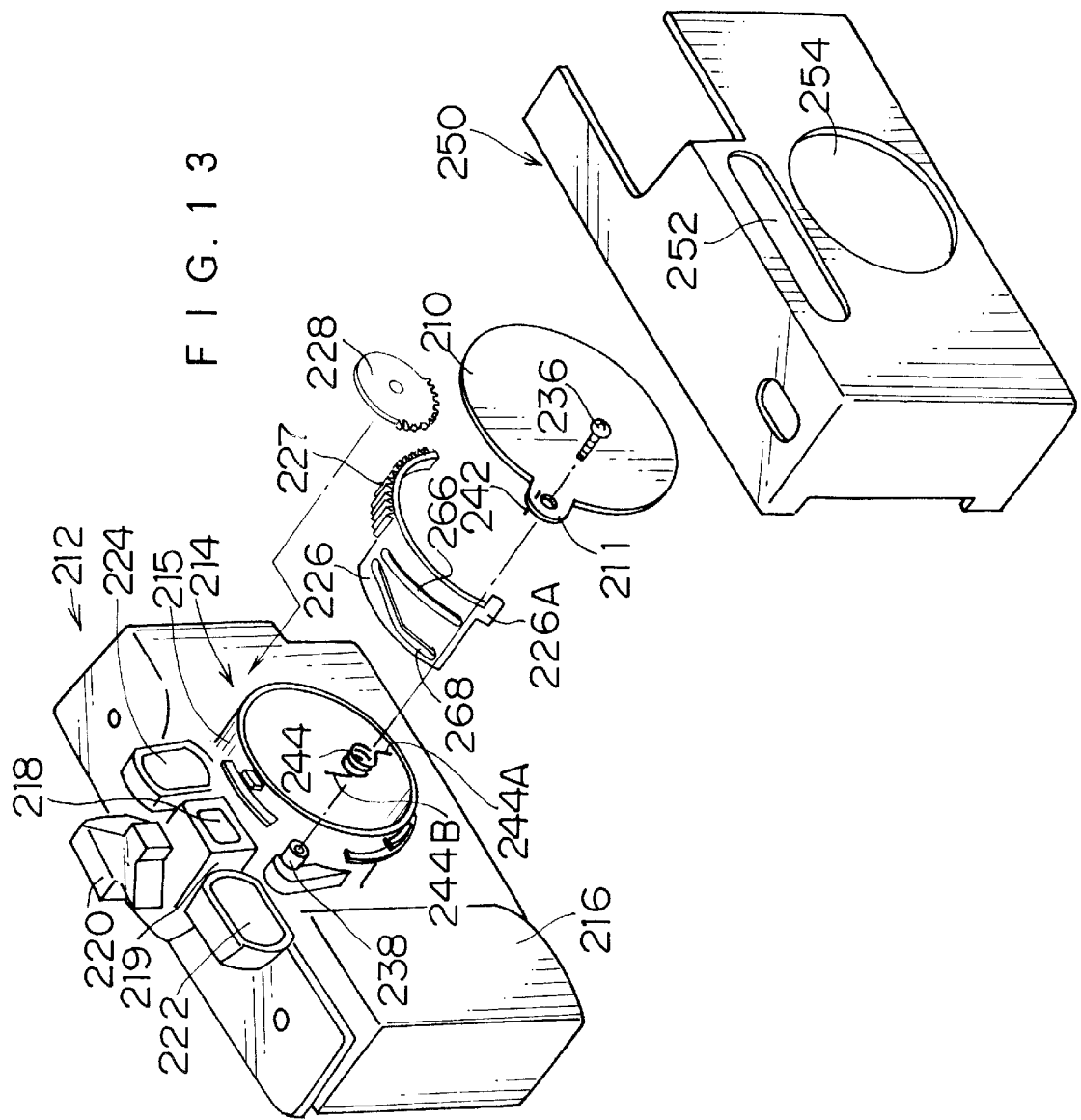
F I G. 13

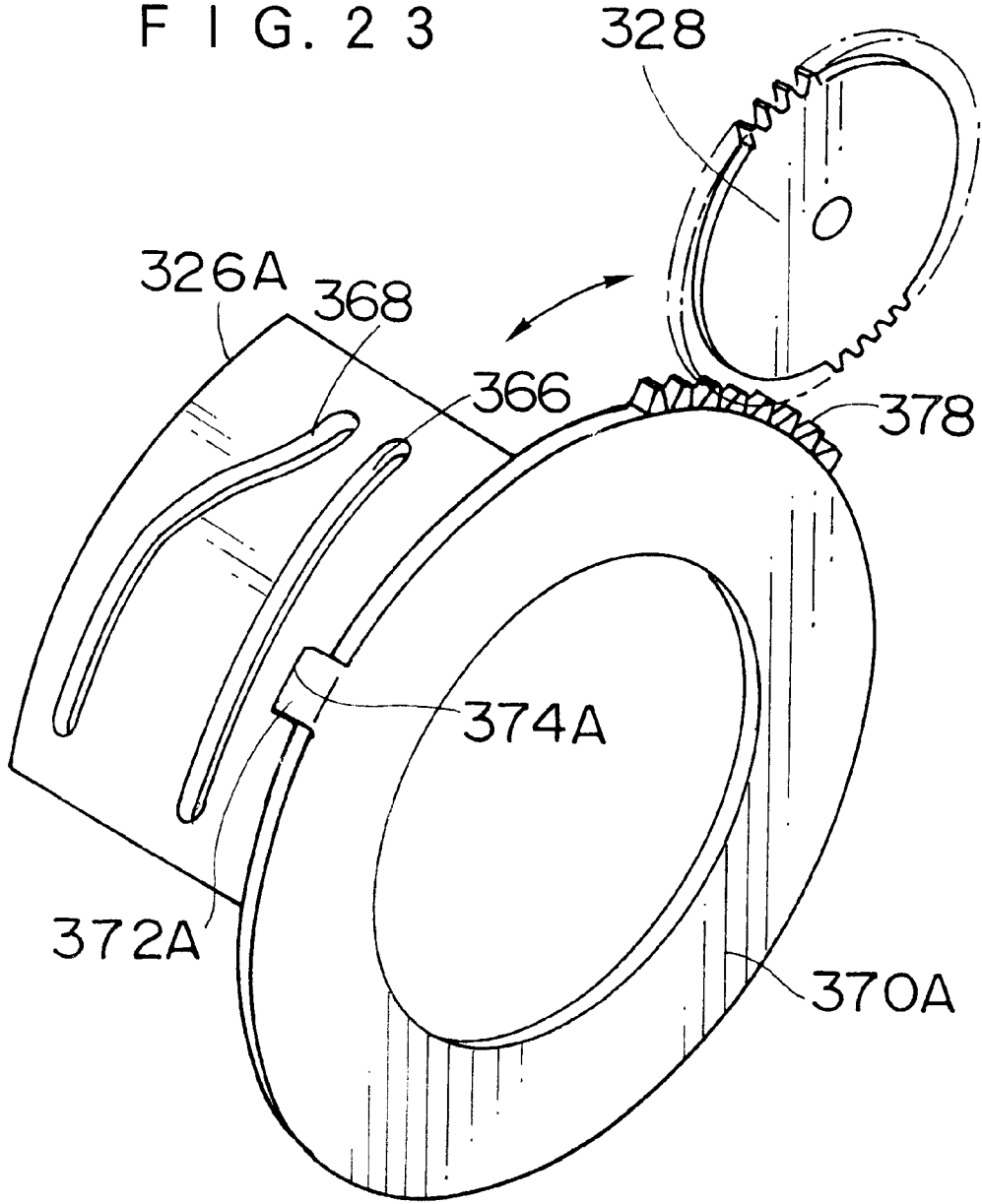

LENS COVER APPARATUS FOR CAMERA

BACKGROUND OF THE INVENTION

1. Field of the Invention

The present invention relates generally to a lens cover apparatus for a camera, and more particularly to a lens cover and a driving device for the lens cover, which is provided between the body and a casing of the camera and uncovers and covers a lens in a lens barrel by opening and closing an opening of the casing, which faces a fixed cylinder of the lens barrel.

2. Description of Related Art

U.S. Pat. No. 4,283,132 discloses a lens cover for protecting a lens of a camera while the camera is unused. The lens cover is provided between the body and a casing of the camera so that the lens cover can pivot to open and close an opening of the casing that faces the lens. The lens cover protects the lens by closing the opening.

The lens cover is driven by a mechanism with a drive ring. The drive ring is rotatably mounted on the circumference of a fixed cylinder for a taking lens barrel, which is formed on the body of the camera. A power gear engages with teeth formed on the outer peripheral surface of the drive ring. A power transmission member is provided between the drive ring and the lens cover so as to transmit a rotational force of the drive ring to the lens cover. Driving the power gear and rotating the drive ring transmit the rotational force to the lens cover through the power transmission member and turn the lens cover to open and close the opening of the casing.

The conventional lens cover apparatus, however, is designed without taking account of the position of a pivot of the lens cover. More specifically, the conventional camera with the lens cover is large since it is necessary to have a space where the lens cover is recessed while the opening is opened. Moreover, a member for preventing the drive ring from coming off the fixed cylinder is fixed to the end of the fixed cylinder after the drive ring is mounted on the fixed cylinder. This increases the thickness of the camera.

Japanese Patent Provisional Publication No. 2-251829 discloses a camera lens cover apparatus, which has a power transmission mechanism including first and second spring members. The power transmission mechanism transmits a driving force of a lens cover driving motor to the lens cover through the first spring member. If an external force acts on the lens cover, the power transmission mechanism cushions the external force by expanding and contracting the first and second spring members to thereby prevent the damage against the driving mechanism for the lens cover. The conventional lens cover apparatus is designed without considering a position where the power transmission mechanism is arranged in the camera. In short, the camera with the conventional lens cover is large since it is necessary to provide a space for arranging the power transmission mechanism.

A driving mechanism for the lens cover is composed of a lens cover drive motor and a power transmission member for transmitting power of the motor to the lens cover. When the lens cover drive motor is run, its power is transmitted to the lens cover through the power transmission member to drive the lens cover in order to open and close the opening. There is a camera, which has the lens cover and the zoom lens and moves movable lenses of a zoom finder forward and backward so that an image of a subject magnified by a photographic magnification can be seen through the finder.

The movable lenses, which are supported by movable lens holding frames, are arranged in a finder frame in such a manner as to freely move forward and backward. Cam followers project from the movable lens holding frames, and the cam followers are fitted in cam grooves formed on a finder cam. The finder cam connects to a cam drive motor. When the cam drive motor drives the finder cam, the cam followers move along the cam grooves and the movable lens holding frames move forward and backward along the optical axis. Consequently, an image of a subject magnified by a photographic magnification can be seen through the finder. In the conventional camera, however, it is necessary to separately provide the driving mechanism for the lens cover and the driving mechanism for the movable lens holding frames of the zoom finder. Thus, many parts are required for the camera, and the camera is large and heavy.

SUMMARY OF THE INVENTION

In view of the foregoing, an object of the present invention is to provide a camera lens cover apparatus in which a pivot of a lens cover is arranged at an optimum position to reduce the size of the camera with the lens cover.

Another object of the present invention is to provide a camera lens cover apparatus that reduces the thickness of the camera by improving a member for preventing a drive ring, which drives the lens cover to open and close an opening, from coming off a fixed cylinder.

A further object of the present invention is to provide a camera lens cover apparatus, in which a power transmission mechanism is arranged at an optimum position to reduce the size of the camera.

A still further object of the present invention is to provide a lens cover apparatus, which reduces the size and weight of a camera having the lens cover apparatus and a mechanism for moving movable lens holding frames of a zoom finder.

To achieve the above-mentioned object, the present invention is directed to a camera comprising: a camera body having a fixed cylinder of a lens barrel, a film cartridge chamber at a side of the fixed cylinder, and a finder above the fixed cylinder; a casing attached to the front of the camera body, the casing having an opening facing the fixed cylinder; and a lens cover arranged between the camera body and the casing, the lens cover having a pivot in a space enclosed by the film cartridge chamber, the fixed cylinder and the finder of the camera body, the lens cover turning on the pivot to open and close the opening of the casing.

According to the present invention, the pivot of the lens cover is arranged in the space enclosed by the film cartridge chamber, the fixed cylinder and the finder. If the lens cover turns on the pivot to recess from the opening of the casing, the lens cover is positioned at the front of the film cartridge chamber. The camera can be small since the relatively-wide front of the film cartridge chamber is utilized as the recessed space for the lens cover.

Alternatively, the pivot of the lens cover may be arranged in a space that is enclosed by the film cartridge chamber, the fixed cylinder and a gear train. If the lens cover turns on the pivot to recess from the opening of the casing, the lens cover is positioned at the front of the film cartridge chamber. The gear train transmits a driving force of a main motor to various driving mechanisms such as a film feeding mechanism and a film winding mechanism. The camera can be small since the front of the film cartridge chamber is utilized as the recessed space for the lens cover.

Preferably, a driving mechanism using a drive ring is used to drive the lens cover. The drive ring is rotatably arranged on the outer peripheral surface of the fixed cylinder of the camera body. Preferably, teeth are formed on the outer peripheral surface of the drive ring, and a drive gear is engaged with the teeth. A power transmission member for transmitting a rotational force of the drive ring to the lens cover is provided between the drive ring and the lens cover. If the drive gear is run to rotate the drive ring, the power transmission member transmits the rotational force of the drive ring to the lens cover. Consequently, the lens cover pivots to open and close the opening of the casing.

The driving mechanism enables the lens cover to open or close only by rotating the drive ring by a small angle. This eliminates the necessity of forming the teeth at the whole circumference of the drive ring, and reduces the costs for manufacturing the drive ring.

Preferably, there is provided a forcing member for pressing the drive ring against the outer peripheral surface of the fixed cylinder, and this keeps the position of the drive ring even if the teeth of the drive ring are released from the drive gear to make the drive ring free.

To achieve the above-mentioned objects, the present invention is also directed to a camera comprising: a camera body having a fixed cylinder of a lens barrel, the fixed cylinder having a projecting part on the outer peripheral surface thereof; a casing attached to the front of the camera body, the casing having an opening facing the fixed cylinder; a lens cover arranged between the camera body and the casing, the lens cover being turned to open and close the opening of the casing; a motor provided in the camera body; and a drive ring rotatably arranged on the outer peripheral surface of the fixed cylinder of the camera body, the drive ring having a chip at the inner circumference thereof, the projecting part being able to pass through the chip, the drive ring transmitting a rotational force of the motor to the lens cover; wherein the drive ring is mounted on the outer peripheral surface of the fixed cylinder with the chip being joined with the projecting part and is rotated by a predetermined amount to thereby prevent the drive ring from coming off the fixed cylinder.

According to the present invention, the projecting part is formed on the outer peripheral surface of the fixed cylinder, and the chip is formed at the inner circumference of the drive ring. The projecting part can pass through the chip. The drive ring is mounted on the circumference of the fixed cylinder with the chip being joined with the projecting part. Then, the drive ring is rotated by a predetermined amount so that the projecting part can prevent the drive ring from coming off the fixed cylinder. This eliminates the necessity of separately providing a member for preventing the drive ring from coming off, and decreases the number of parts for the camera and reduces the thickness of the camera.

To achieve the above-mentioned object, the present invention is directed to a camera, comprising: a camera body having a fixed cylinder of a lens barrel and a film cartridge chamber; a casing attached to the front of the camera body, the casing having an opening facing the fixed cylinder; a lens cover which opens and closes the opening of the casing; a motor provided in the camera body; a power transmission mechanism which transmits power of the motor to the lens cover, the power transmission mechanism not transmitting an external force, applied to the lens cover, to the motor, the power transmission mechanism being arranged in a recession formed between the fixed cylinder and the film cartridge chamber of the camera body.

According to the present invention, the power transmission mechanism is arranged a conventionally-unused recession that is formed between the fixed cylinder and the film cartridge chamber of the camera body. This reduces the size of the camera.

If the power transmission mechanism is a rotary motion mechanism (a gear mechanism), it is necessary to provide a big space in order to arrange gears. It is therefore difficult to place the power transmission mechanism in the recession. To address this problem, the power transmission mechanism is preferably a rectilinear motion mechanism, which coverts the rotary motion of the motor into a rectilinear motion, which is transmitted to the lens cover. The lengthwise direction of the power transmission mechanism is parallel to the lengthwise direction of the recession. Thus, the linear motion mechanism can be arranged in a smaller space than the rotary motion mechanism. The recession, which is usually longer than is wide, is suitable for arranging the power transmission mechanism, since the rectilinear motion mechanism as the power transmission mechanism is also longer than is wide.

To achieve the above-mentioned objects, the present invention is directed to a camera comprising: a camera body having a fixed cylinder of a lens barrel and a finder frame; a casing attached to the front of the camera body, the casing having an opening facing the fixed cylinder; a lens cover which opens and closes the opening of the casing; a movable lens holding frame arranged in the finder frame of the camera body, the movable lens holding frame being movable forward and backward, the movable lens holding frame holding a movable lens of a finder; and a cam member which moves the movable lens holding frame forward and backward; wherein the lens cover is opened and closed by a driving force of the cam member.

According to the present invention, the lens cover is operatively connected to the cam member for moving the movable lens holding frame of the finder, so that the driving force of the cam member can open and close the lens cover This eliminates the necessity of providing a special mechanism for driving the lens cover, and reduces the size and weight of the camera.

To achieve the above-mentioned objects, the present invention is directed to a camera comprising: a camera body having a fixed cylinder of a lens barrel and a finder frame; a casing attached to the front of the camera body, the casing having an opening facing the fixed cylinder; a lens cover for opening and closing the opening of the casing; a drive member for opening and closing the lens cover; a movable lens holding frame arranged in the finder frame of the camera body, the movable lens holding frame being movable forward and backward, the movable lens holding frame holding a movable lens of a finder; and a cam member which moves the movable lens holding frame forward and backward; wherein the drive member connects and the cam member connect to one another, both the lens cover and the movable lens holding frame being driven by a driving force applied to either one of the drive member and the cam member.

According to the present invention, the drive member for driving the lens cover connects to the cam member for driving the movable lens holding frame of the finder. Both the lens cover and the movable lens holding frame are driven by the driving force applied to either one of the drive member and the cam member. Therefore, one drive motor is used to drive both the lens cover and the movable lens holding frame, and this reduces the size and weight of the camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a longitudinal sectional view showing a lens barrel on which a drive ring is mounted;

FIG. 7 is an explanation drawing showing an external force absorbing member when an external force acts on the lens cover in a direction toward the uncovering position;

FIG. 13 is an exploded perspective view showing a lens cover apparatus according to the third embodiment of the present invention;

FIG. 23 is a perspective view showing the essential parts of an embodiment in which the cover drive ring drives the finder cam.

DETAILED DESCRIPTION OF THE PREFERRED EMBODIMENT

This invention will be described in further detail by way of example with reference to the accompanying drawings.

Figure 1:
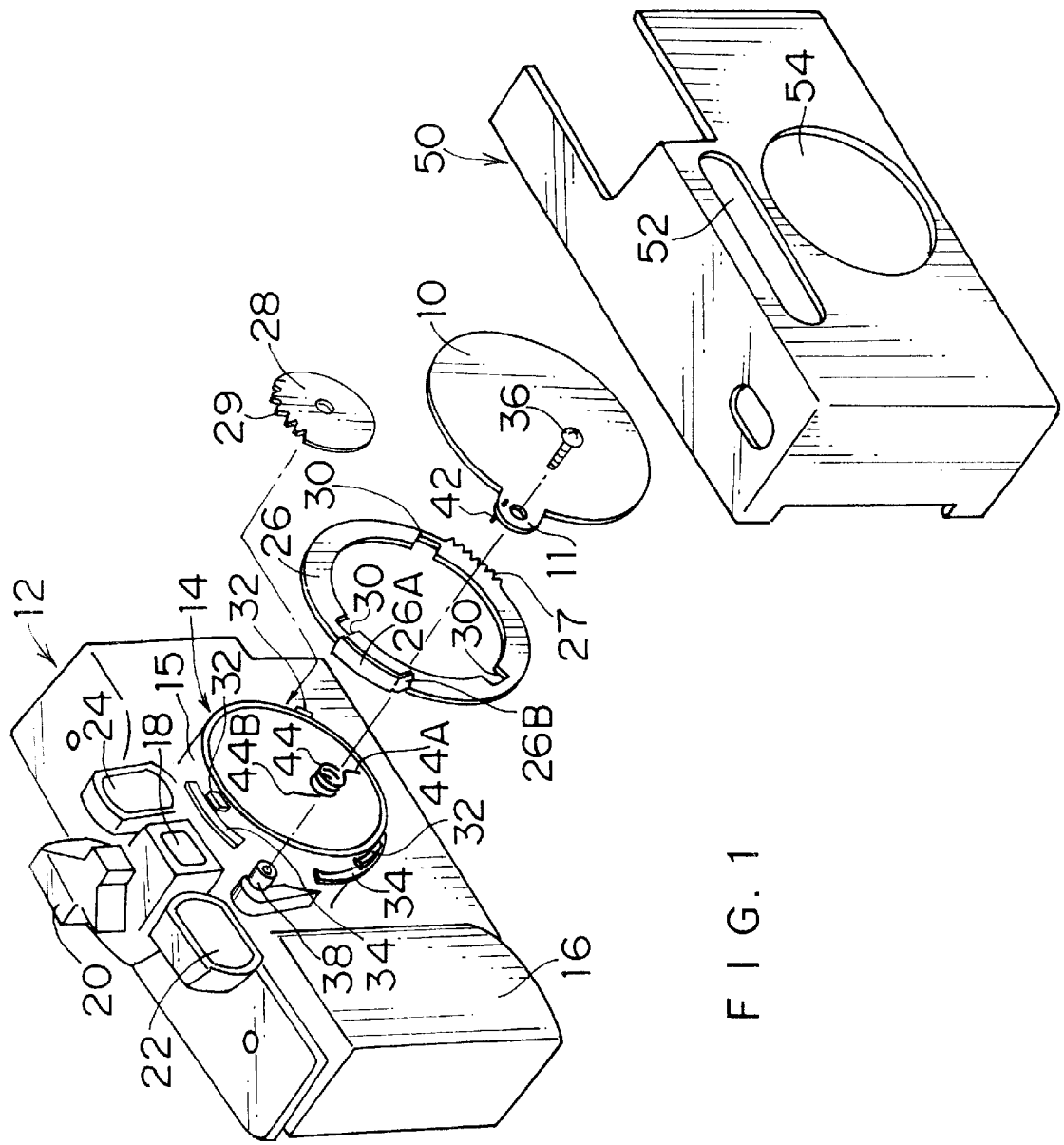
FIG. 1 an exploded perspective view showing a lens cover apparatus according to the first embodiment of the present invention.

FIG. 1 is a perspective view showing the state wherein a lens cover 10 and a driving device therefor of a lens cover apparatus according to the first embodiment of the present invention are installed in a camera body 12.

The camera body 12 is a box, which is long from side to side, and a fixed cylinder 14 of a taking lens barrel is arranged in the center of the front of the camera body 12. The fixed cylinder 14 is formed unitedly with the camera body 12 or is formed separately from the camera body 12 and attached to the camera body 12. A film cartridge chamber 16 is defined at the left side of the fixed cylinder 14 in FIG. 1. A finder 20 is provided above the fixed cylinder 14, and the finder 20 has a movable lens 18 at the front of the camera body 12 and an eyepiece at the rear of the camera body 12. Focusing windows 22 and 24 of an autofocus (AF) apparatus are provided at sides of the movable lens 18.

A casing 50 is attached at the front of the camera body 12. The casing 50 has openings 54 and 52, which face to the fixed cylinder 14, the movable lens 18 of the finder 20 and the focusing windows 22 and 24. The opening 52, which faces to the movable lens 18 and the focusing windows 22 and 24, is opened even while the camera is unused. The opening 54 facing to the fixed cylinder 14 is closed with the lens cover 10 while the camera is unused, and the front of a taking lens in the fixed cylinder 14 is thus covered and protected with the lens cover 10.

The lens cover 10 is arranged between the camera body 12 and the casing 50. The lens cover 10 is driven by a drive mechanism, which includes a drive ring 26, a power gear 28 for driving the drive ring 26 and a motor 31 for driving the power gear 28 (see FIG. 3).

As shown in FIG. 1, the drive ring 26 is mounted on the outer peripheral surface 15 of the fixed cylinder 14 in such a way as to rotate along the circumference of the fixed cylinder 14. Three chips 30 are formed at regular intervals at the inner circumference of the drive ring 26. Correspondingly to the three chips 30, three projections 32 are formed at regular intervals on the outer peripheral surface 15 of the fixed cylinder 14, and three guides 34 are formed at the rear of the projections 32. The drive ring 26 is mounted on the outer peripheral surface 15 of the fixed cylinder 14 in the state wherein the chips 30 are joined with the projections 32. If the drive ring 26 rotates by a predetermined angle so as to separate the chips 30 from the projections 32, the drive ring 26 rotates in the state of being pinched between the projections 32 and the guides 34. Thereby, the drive ring 26 can stably rotate without coming off the fixed cylinder 14.

Since the projections 32 and the guides 34 are formed on the fixed cylinder 14, there is no necessity of additionally providing a means for preventing the drive ring 26 from coming off the fixed cylinder 14. This reduces the number of parts for the camera, and reduces the thickness of the camera. Further, the drive ring 26 can easily be attached to the fixed cylinder 14.

If the chips 30 are joined with the projections 32, the drive ring 26 may come off the fixed cylinder 14. In this embodiment, the drive ring 26 is rotatable within a range of an angle θ (θ<120°) at which the chips 30 are not joined with the projections 32. The number of projections 32 is not restricted to three, but it may be set according to the rotational range of the drive ring 26. The guides 34 do not serve to prevent the drive ring 26 from coming off the fixed cylinder 14, but it serves the purpose of supporting the drive ring 26 steadily.

Figure 3:
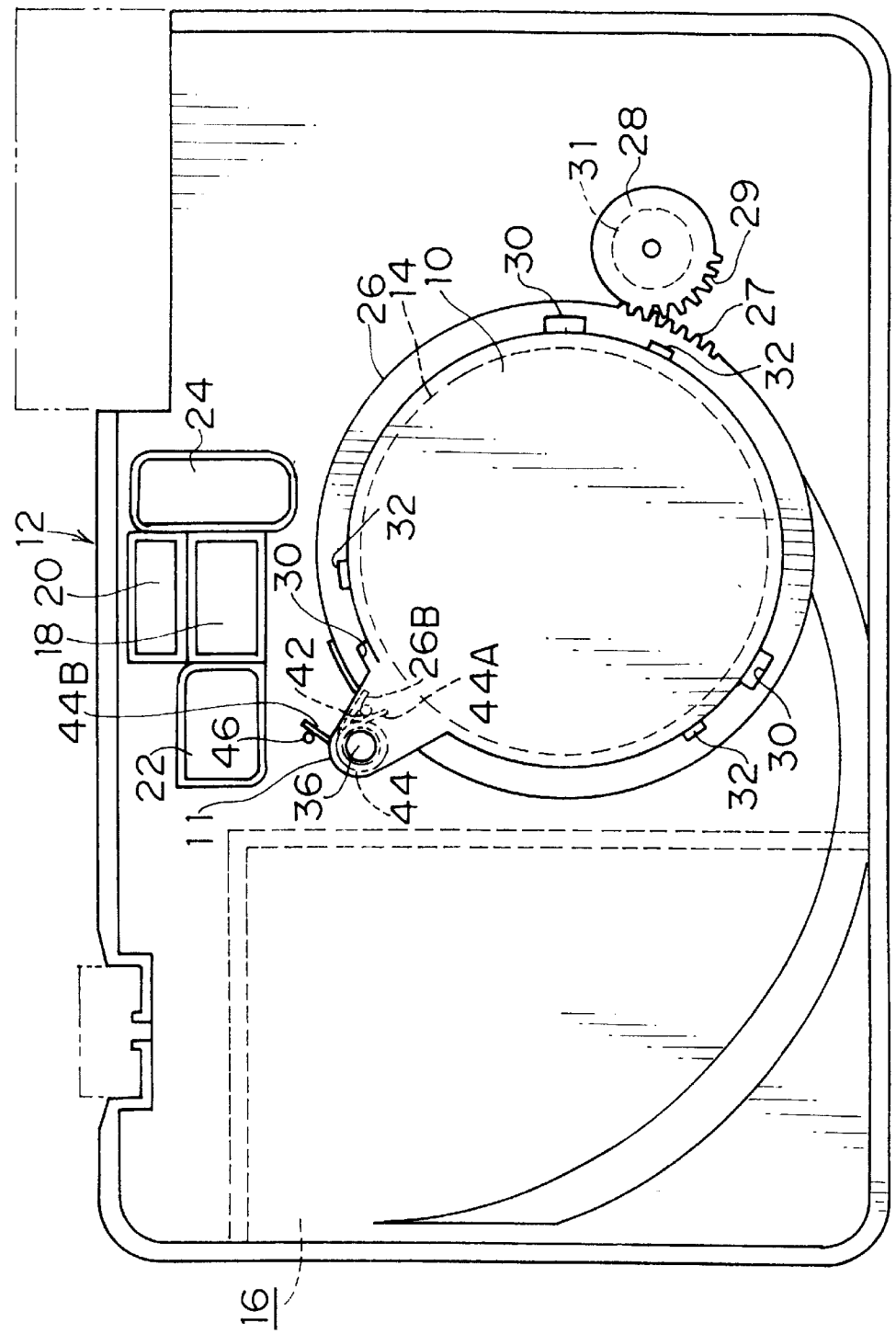
FIG. 3 is a front view showing a camera body when a lens cover is at the covering position.
Figure 4:
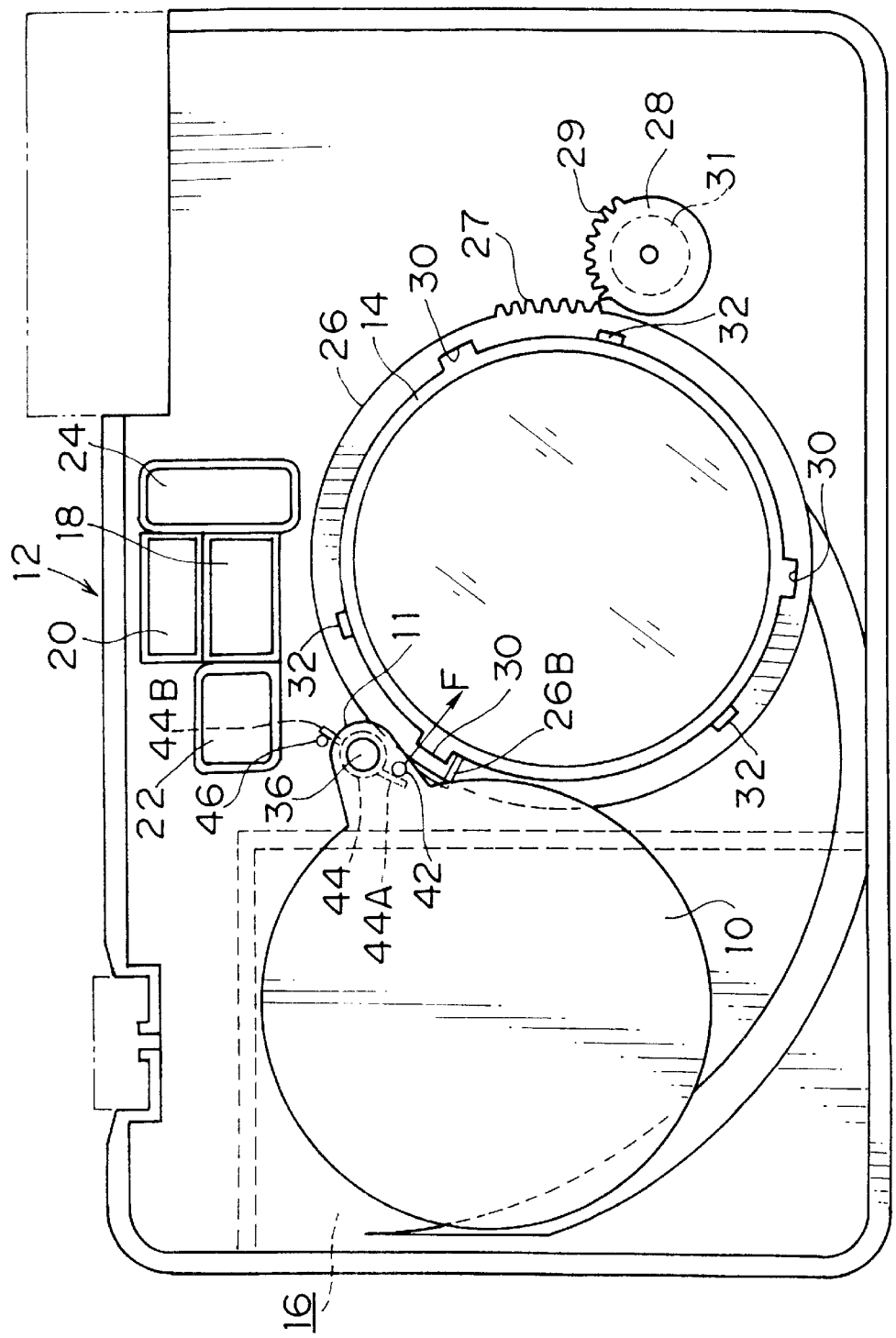
FIG. 4 is a front view showing the camera body when the lens cover is at the uncovering position.

As shown in FIGS. 3 and 4, teeth 27 are formed at a part of the circumference of the drive ring 26. The teeth 27 are formed within a range corresponding to the rotational angle θ. The teeth 27 are engaged with teeth 29 of the power gear 28. As is the case with the teeth 27, the teeth 29 are formed within a range corresponding to the rotational angle θ.

Therefore, the teeth 27 are separated from the teeth 29 at one end of the rotational angle θ, and this causes the drive ring 26 to freely rotate with respect to the drive gear 28. In this embodiment, as shown in FIG. 4, the drive ring 26 can freely rotate with respect to the power gear 28 when the lens cover 10 is open. If the vibrations or the external force is applied to the drive ring 26 and causes the drive ring 26 to be displaced in the rotational direction with respect to the fixed cylinder 14, the lens cover 10 cannot be opened and closed smoothly. To address this problem, a position regulation mechanism prevents the drive ring 26 from being displaced in the rotational direction with respect to the fixed cylinder 14. The position regulation mechanism will be described later. If an external force is applied to the lens cover 10 and disturbs the opening thereof when the drive mechanism opens the lens cover 10, the lens cover 10 and the teeth 27 and 29 may be broken by the external force. To solve this problem, there is provided a mechanism for absorbing the external force. This external force absorbing mechanism will also be described later.

The lens cover 10 is disc-shaped in such a manner as to cover the front of the fixed cylinder 14 and close the opening 54 of the casing 50. A projecting piece 11 is formed at a part of the peripheral edge of the lens cover 10, and a pin 36 is mounted in the projecting piece 11 as shown in FIG. 1. The pin 36 is inserted into a bearing 38, which projects from the fixed cylinder 14 of the camera body 12. The lens cover 10 reciprocates with the bearing 38 being a pivot between the covering position in FIG. 3 and the uncovering position in FIG. 4.

As shown in FIGS. 3 and 4, the bearing 38 is provided in a space that is enclosed by the film cartridge chamber 16, the fixed cylinder 14 and the movable lens 18 of the finder 20. If the bearing 38 is provided in the space, the front of the film cartridge chamber 16 can be used as a recessed space for the lens cover 10 as shown in FIG. 4. The film cartridge chamber 16 is wider than the other parts of the camera body 12 in order to contain a film cartridge, and the front of the film cartridge chamber 16 can be used as the recessed space for the lens cover 10.

As stated above, the camera can be made smaller than the conventional camera by arranging the pivot of the lens cover 10 at the above-mentioned position. The position of the pivot of the lens cover 10 is not restricted to the above-mentioned position as long as the front of the film cartridge chamber 16 can be used as the recessed space of the lens cover 10.

Figure 5:
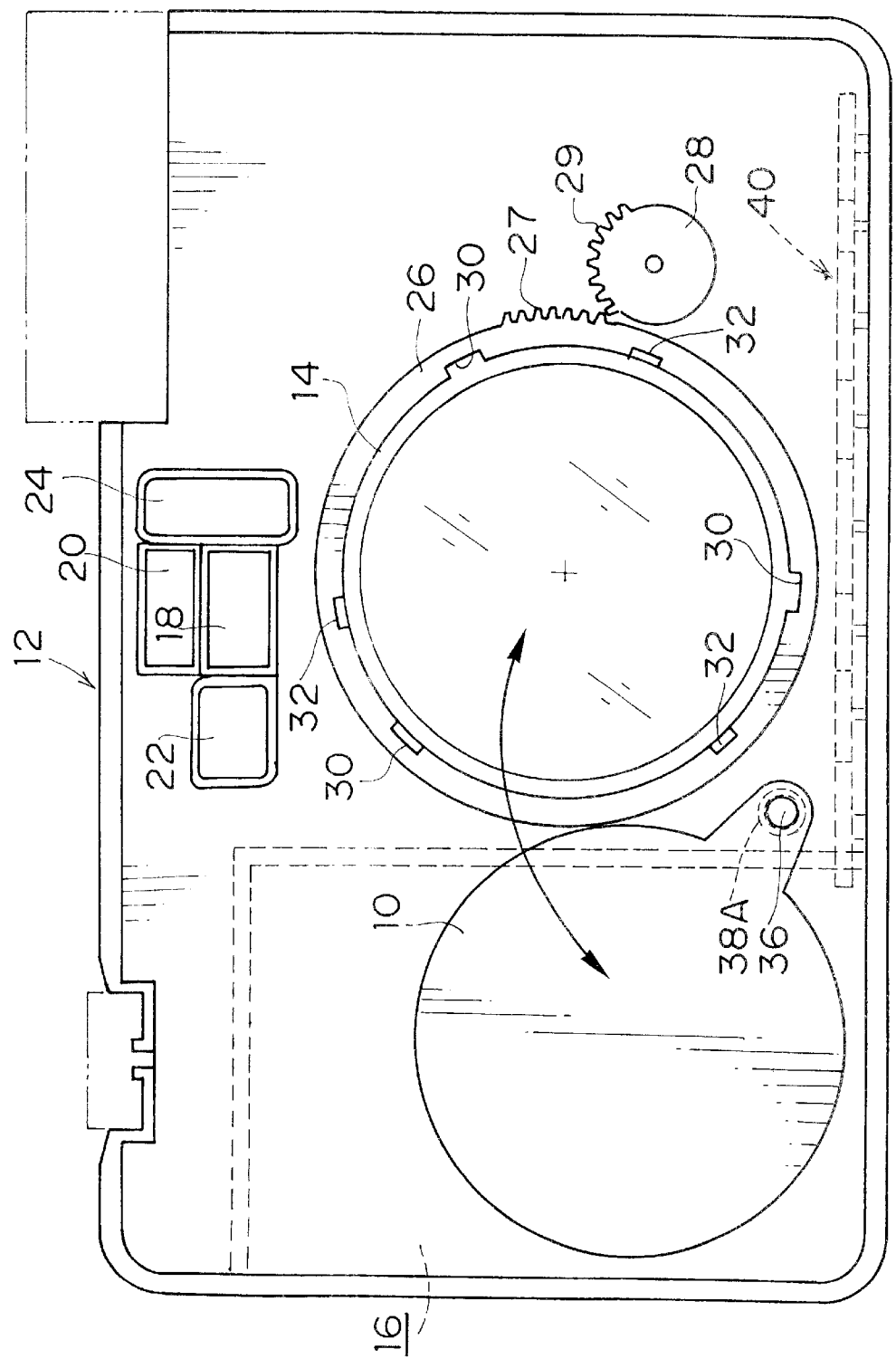
FIG. 5 is an explanation drawing showing another mounting position of a pivot of the lens cover.

As shown in FIG. 5, a bearing 38A for pivotally supporting the lens cover 10 may be arranged in a space that is enclosed by the film cartridge chamber 16, the fixed cylinder 14 and a gear train 40. The gear train 40 transmits a driving force from a main motor of the camera body 12 to drive mechanisms for feeding the film, winding the film, and the like. The gear train 40 is ordinarily provided at the bottom of the camera body 12.

As shown in FIG. 1, a power transmission member or a pin 42 projects from the projecting piece 11 of the lens cover 10. As shown in FIGS. 3 and 4, one end 44A of a torsion coil spring 44 mounted on the circumference of the bearing 38 connects to the pin 42, and the other end 44B of the torsion coil spring 44 is forced against a pin 46 projecting from the front of the camera body 12. The force of the torsion coil spring 44 is transmitted to the lens cover 10 through the pin 42 and the projecting piece 11, and the camera body 12 holds the lens cover 10, which is always forced in the closing direction.

Figure 6:
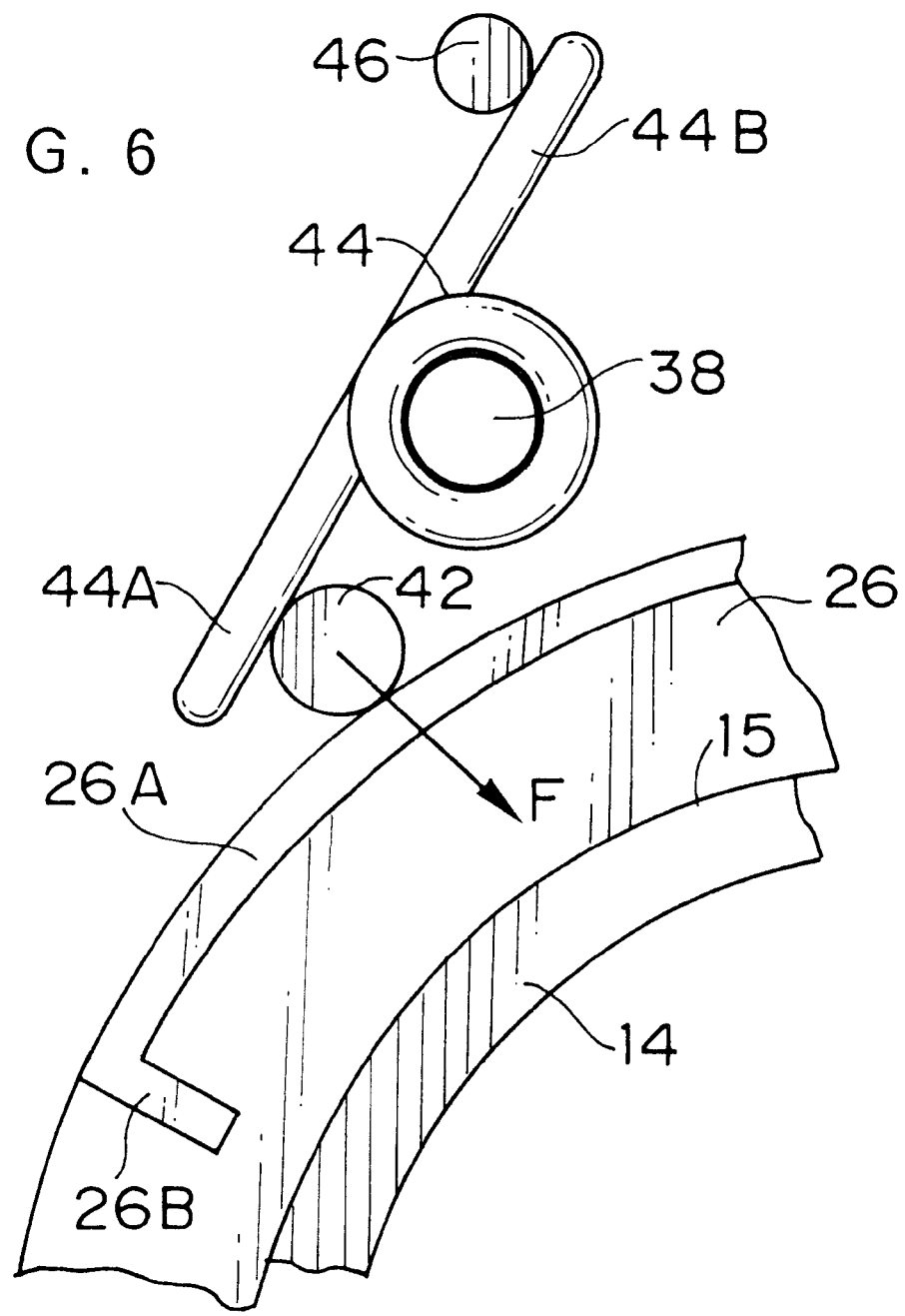
FIG. 6 is an explanation drawing showing the motion of a position regulation member for the drive ring.

While the lens cover 10 is open, the torsion coil spring 44 presses the pin 42 against the circumference of a bent piece 26A of the drive ring 26 as shown in FIG. 6. The force, which is transmitted from the torsion coil spring 44 to the pin 42, is a force F for pressing the drive ring 26 against the fixed cylinder 14. The force F prevents the rotation of the drive ring 26 with respect to the fixed cylinder 14. When the lens cover 10 is open, in other words, when the teeth 27 are separated from the teeth 29 to cause the drive ring 26 to freely rotate with respect to the gear 28, the drive ring 26 is not displaced in the rotating direction even if vibrations or an external force is applied to the drive ring 26 since the drive ring 26 is pressed against the fixed cylinder 14. In short, the position regulation mechanism is composed of the pin 42 and the torsion coil spring 44. The position regulation mechanism is not restricted to the above-described mechanism.

While the lens cover 10 is closed, the pin 42 is pressed against an elastic piece 26B formed at the end of the bent piece 26A of the drive ring 26 as shown in FIG. 7. The elastic piece 26B with a predetermined elasticity is formed by bending the end of the bent piece 26A toward the center of the drive ring 26. If the lens cover 10 is opened in this state, the drive ring 26 is rotated counterclockwise in FIG. 7. Pressing the pin 42 against the elastic piece 26B causes the lens cover 10 in the closed state in FIG. 3 to turn clockwise with the pin 36 being a pivot. When the pin 42 moves onto the elastic piece 26B and turns by a predetermined angle, the lens cover 10 is opened as shown in FIG. 4. In other words, the rotational force of the drive ring 26 is transmitted to the lens cover 10 through the elastic piece 26B and the pin 42 to thereby open the lens cover 10. The process of closing the lens cover 10 is reversed from the process of opening it.

If an external force disturbs the rotation of the lens cover 10 when the drive mechanism opens the lens cover 10, the force disturbing the opening is absorbed by the elastic deformation of the elastic piece 26B as shown with alternate long and two short dashes line in FIG. 7. This prevents the lens cover 10 and the teeth 27 and 29 from being damaged by the external force. In short, the absorption mechanism is composed of the pin 42 and the elastic piece 26B in this embodiment. The absorption mechanism is not restricted to the above-described mechanism.

The elastic piece 26B may be made of plastic, and it is more preferable to form it by bending an elastic metal plate to achieve the excellent durability. If the elastic piece 26B is made of the metal plate, the whole drive ring 26 is made of the metal plate.

In this embodiment, the position of the pivot of the lens cover 10 is described in relation to the film cartridge chamber 16, but in a camera provided with a capacitor for an electronic flash in proximity to the fixed cylinder 14 of the film cartridge chamber 16, the same effect can be achieved even if the pivot of the lens cover 10 is provided in a space enclosed by the capacitor, the fixed cylinder 14 and the movable lens 18 of the finder. Alternatively, the same effect can be achieved even if the pivot of the lens cover 10 is provided in a space enclosed by the capacitor, the fixed cylinder 14 and the gear train 40.

Figure 8:
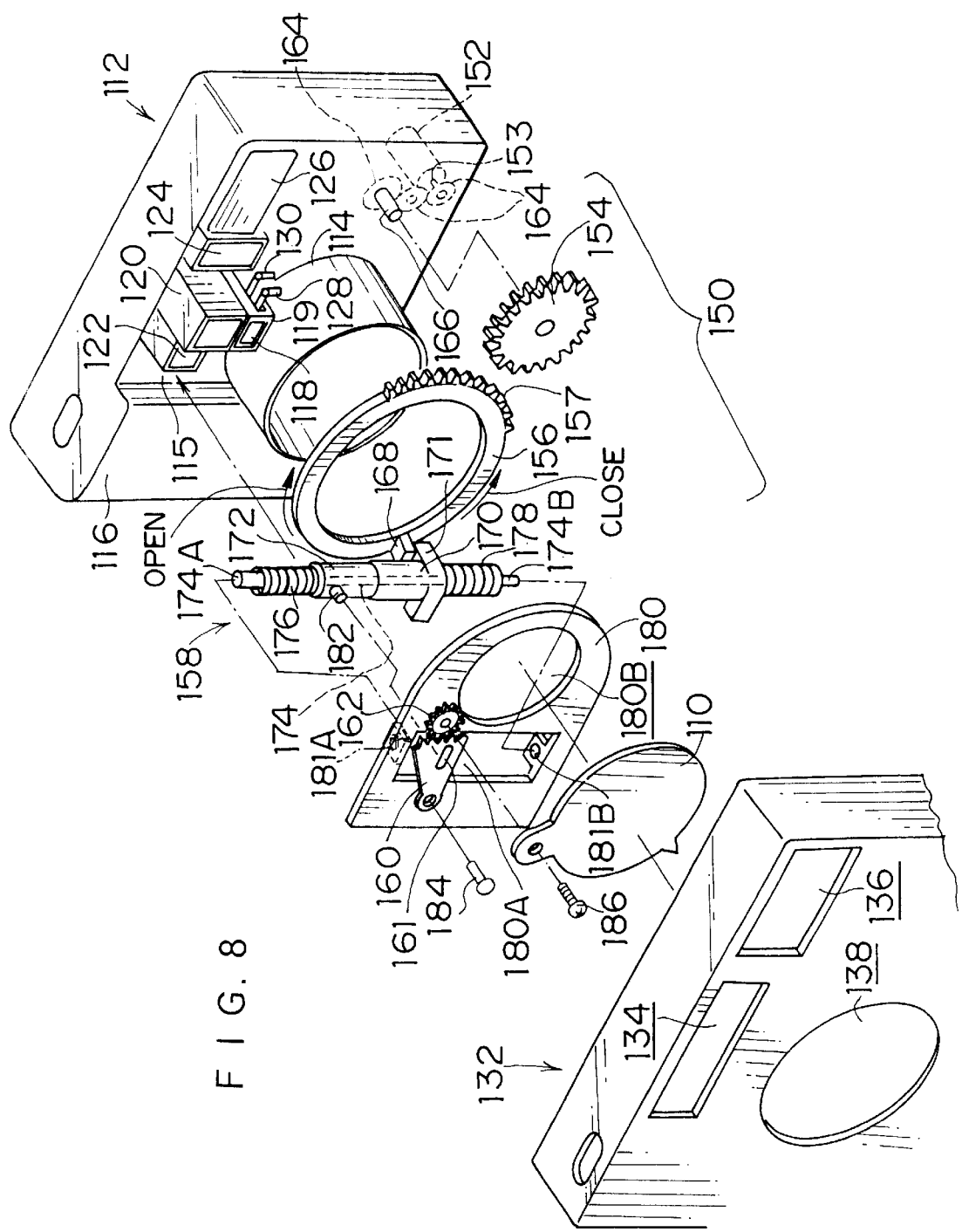
FIG. 8 is an exploded perspective view showing a lens cover apparatus according to the second embodiment of the present invention.

FIG. 8 is a perspective view showing the state wherein a lens cover 110 and a lens cover driving mechanism 150 of the lens cover apparatus according to the second embodiment of the present invention are integrated with a camera body 112.

The camera body 112 is a box, which is long from side to side, and a fixed cylinder 114 of a lens barrel is provided almost at the center of the front of the camera body 112. The fixed cylinder 114 is formed unitedly with the camera body 112, or is formed separately from the camera body 112 and attached to the camera body 112. A film cartridge chamber 116 is defined at the left side of the fixed cylinder 114 in FIG. 8, and a finder 120 is provided above the fixed cylinder. The finder 120 has movable lenses 118 at the front of the camera body 112 and an eyepiece at the rear of the camera body 112. Focusing windows 122 and 124 of an AF device are provided at sides of the movable lenses 118. An electronic flash window 126 is provided at the right side of the focusing window 124.

The movable lenses 118 are composed of a front group and a rear group. The movable lenses 118 are arranged within a finder frame 119. The movable lenses 118 of the front group and the rear group (only one movable lens 118 is illustrated in FIG. 8) are held in lens holding frames. Cam followers 128 and 130 project from the lens holding frames. The cam followers 128 and 130 are engaged with cam grooves formed on a cam member (not shown). Driving the cam member causes the cam followers 128 and 130 to move along the cam grooves to thereby move the movable lenses 118 along the optical axis. Therefore, a subject image magnified correspondingly to a photographic magnification is seen through the finder 120.

A casing 132 is attached at the front of the camera body 112. The casing 132 has openings 138, 134 and 136, which face to the fixed cylinder 114, the movable lenses 118 of the finder 120, the focusing windows 122 and 124 and the electronic flash window 126. The opening 134 facing to the movable lenses 118 and the focusing windows 122 and 124 and the opening 136 facing to the electric flash window 126 are opened even while the camera is unused. While the camera is unused, the opening 138 facing to the fixed cylinder 114 is closed by the lens cover 110. Consequently, the front of a taking lens in the fixed cylinder 114 is covered with the lens cover 110 so that the taking lens can be protected.

The lens cover 110 is arranged between the camera body 112 and the casing 132. The lens cover 110 is driven by a lens cover driving mechanism 150, which comprises a drive motor 152 indicated by a broken line in FIG. 8, a drive gear 154, a drive ring 156, a power transmission mechanism 158, a sector gear 160 and a pinion 162.

The drive motor 152 is built in the camera body 112, and a spindle 153 of the drive motor 152 connects to an output shaft 166 through a reducing mechanism composed of a gear train 164 indicated by broken lines in FIG. 8. The output shaft 166 projects from the front of the camera body 122, and the drive gear 154 is fixed to the output shaft 166.

The drive ring 156 is mounted on the circumference of the fixed cylinder 114 of the camera body 112 in such a manner that the drive ring 156 can rotate along the circumference of the fixed cylinder 114. Teeth 157 are formed at a part of the circumference of the drive ring 156, and the teeth 157 are engaged with the drive gear 154. When the drive motor 152 rotates the drive gear 154, the drive ring 156 rotates clockwise/counterclockwise around the fixed cylinder 114. A projecting piece 168 is formed at the front of the drive ring 156, and the projecting piece 168 is pressed against the top of a flange part 171 of a lower slider 170 of the power transmission mechanism 158.

The power transmission mechanism 158 includes the lower slider 107, an upper slider 172, a guide shaft 174, an upper spring (a compression spring) 176 and a lower spring (a compression spring) 178. The lower slider 170 and the upper slider 172 are cylindrical and are supported by the guide shaft 174 in such a manner as to freely move vertically. The lower slider 170 is forced upward by the lower spring 178, of which bottom is fixed to the bottom end 174B of the guide shaft 174. The upper slider 172 is forced downward by the upper spring 176, of which top is fixed to the top end 174A of the guide shaft 174. The force of the lower spring 178 is stronger than that of the upper spring 176. In FIG. 8, the top of the lower slider 170 is in contact with the bottom of the upper slider 172.

When the drive ring 156 rotates in a direction to close the cover (counterclockwise) in FIG. 8, the flange part 171 of the lower slider 170 is pressed by the projecting piece 168 of the drive ring 156 so that the lower slider 170 can be moved down, and the upper slider 172 is moved down by the force of the upper spring 176. When the drive ring 156 rotates in a direction to open the cover (clockwise), the flange part 171 of the lower slider 170 is released from the projecting piece 168, and the lower slider 170 is moved with the upper slider 172 by the force of the lower slider 178 over the force of the upper spring 176. As stated above, the power transmission mechanism 158 is a rectilinear motion mechanism, which coverts the rotary motion of the drive ring 156 into the rectilinear motion of the upper slider 172. The power of the rectilinearly-moving upper slider 172 opens and closes the lens cover 110.

The power transmission mechanism 158 is vertically attached to a cover plate 180. More specifically, the top end 174A of the guide shaft 174 is inserted into a mount hole 181A of the cover plate 180, and the bottom end 174B of the guide shaft 174 is inserted into a mount hole 181B of the cover plate 180. When the cover plate 180 is fixed at a preset position of the camera body 112, the power transmission mechanism 158 is fitted in a recession 115 formed between the fixed cylinder 114 and the film cartridge chamber 116 of the camera body 112. The cover plate 180 has an opening 180B facing to the fixed cylinder 114 of the camera body 112.

As stated above, the lens cover driving mechanism 150 of this embodiment uses the recession 115, which was not used in the past, for arranging the power transmission mechanism 158. Thus, there is no necessity of providing the camera with a special space for arranging the power transmission mechanism 158, and this reduces the size of the camera. The recession 115 is longer than is wide, and thus, it is suitable for arranging the power transmission mechanism 158, which is longer than is wide, as the rectilinear motion mechanism.

A description will be given of the structure for connecting the power transmission mechanism 158 and the lens cover 110. The connecting structure includes a pin 182, a sector gear 160 and a pinion 162. The pin 182 horizontally projects from the circumference of the upper slider 172 of the power transmission mechanism 158, and the pin 182 is fitted into a slot 161 of the sector gear 160 through a rectangular opening 180A of the cover plate 180. The sector gear 160 is rotatably supported on the cover plate 180 through a pin 184. The pinion 162 connects to the sector gear 160, and the lens cover 110 connects to the pinion 162 through a pin 186.

When the pin 182 moves down, the pin 182 presses the sector gear 160 in such a manner as to rotate the sector gear 160 clockwise in FIG. 8. The pinion 162 rotates counterclockwise in connection with the sector gear 160. Consequently, the lens cover 110 turns counterclockwise with the pin 186 being a pivot. This causes the lens cover 110 to close the opening 138 of the casing 132 as shown in FIG. 9 and protect the taking lens (not shown).

Figure 10:
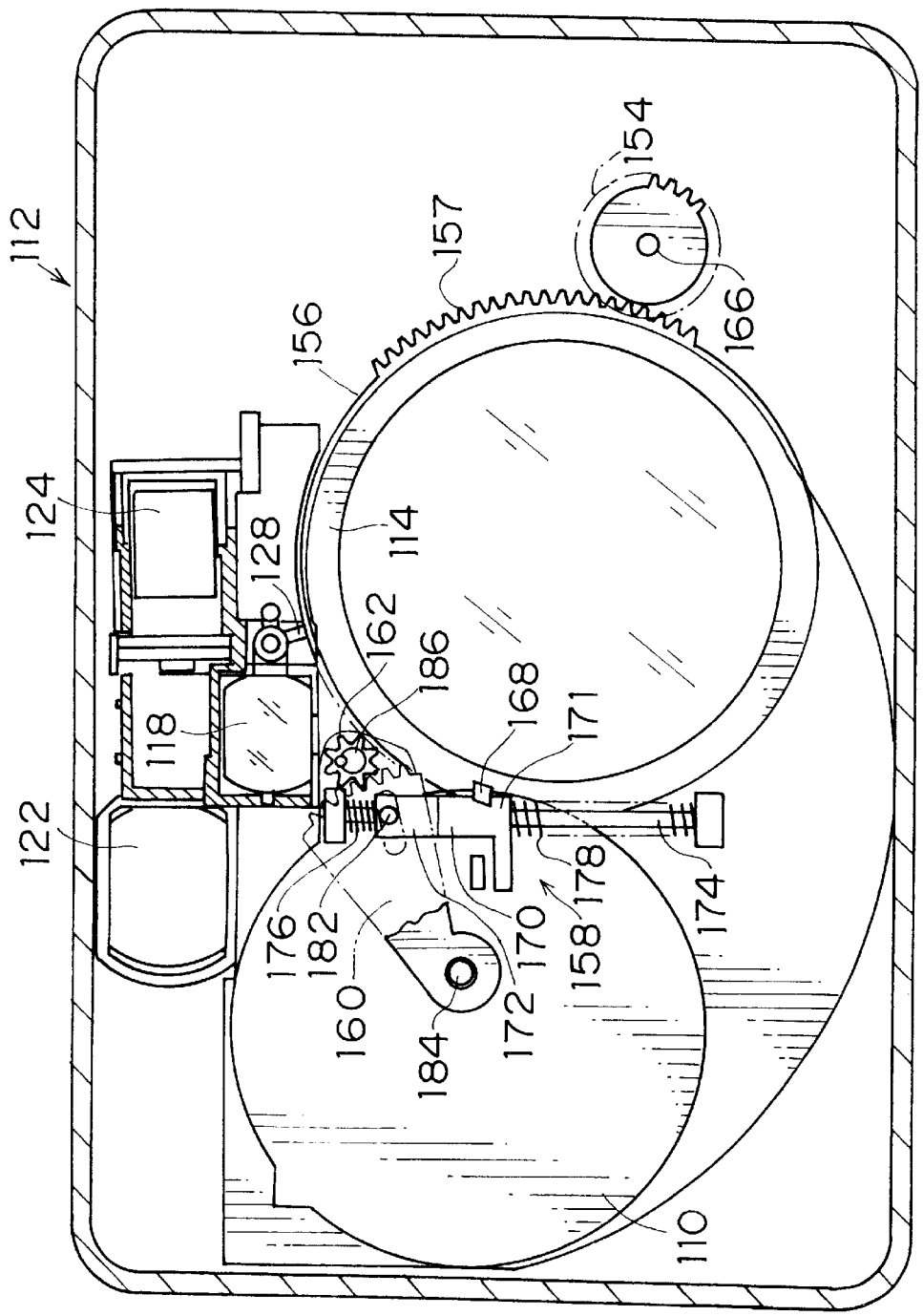
FIG. 10 is a front view showing the camera body when the lens cover is at the uncovering position.

When the pin 182 moves up, the pin 182 presses the sector gear 160 in such a manner as to rotate the sector gear 160 counterclockwise in FIG. 8. The pinion 162 rotates clockwise in connection with the sector gear 160. Consequently, the lens cover 110 turns clockwise with the pin 186 being a pivot. This causes the lens cover 110 to move back from the opening 38 of the casing 132 as shown in FIG. 10 to open the opening 138 and uncover the taking lens.

A description will now be given of the operation of a lens cover apparatus according to the second embodiment of the present invention.

Figure 9:
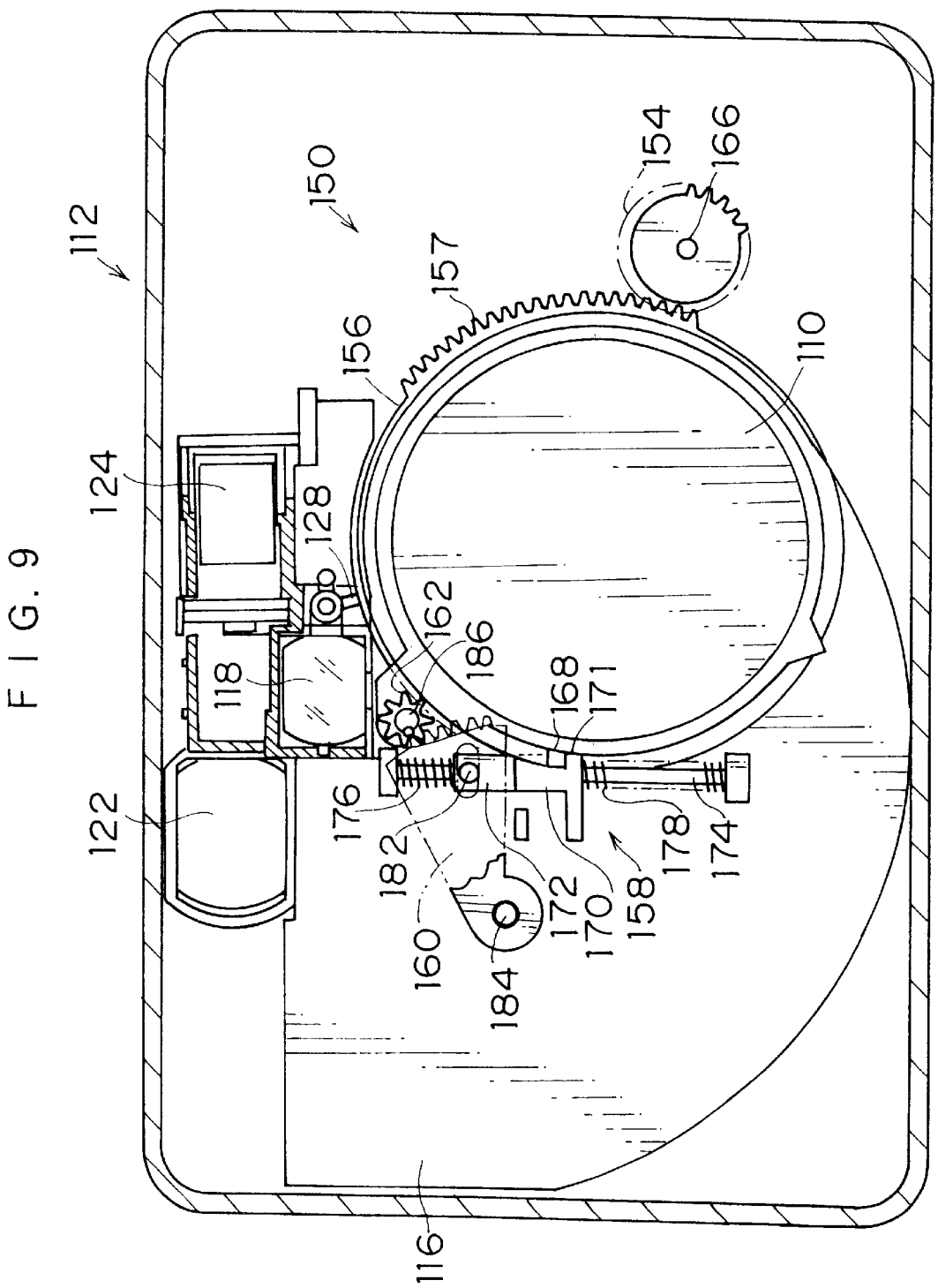
FIG. 9 is a front view showing a camera body when a lens cover is at the covering position.

If a main power switch of the camera is OFF, the lens cover 110 is located at the covering position in FIG. 9. In other words, the lens cover 110 protects the taking lens while the camera is unused.

In FIG. 9, if the main power switch is turned on, the drive motor 152 (see FIG. 8) is run to rotate the drive gear 154 counterclockwise in FIG. 9 and rotates the drive ring 156 clockwise (in a direction to open the cover). This moves up the projecting piece 168 of the drive ring 156, which presses the flange part 171 of the lower slider 170 of the power transmission mechanism 158. Consequently, the lower slider 170 is moved up by the force of the lower spring 178, and accordingly, the upper slider 172 is moved up against the force of the upper spring 176. More specifically, the pin 182 of the upper slider 172 moves up to cause the pin 182 to press the sector gear 160 in such a manner as to rotate the sector gear 160 counterclockwise. In connection with the sector gear 160, the pinion 162 rotates clockwise to cause the lens cover 110 to turn clockwise toward the uncovering position in FIG. 10 with the pin 186 being a pivot. When the lens cover 110 reaches the uncovering position in FIG. 10, the drive motor 152 is stopped.

If the photographing is started in the state shown in FIG. 10 and a zoom lever (not shown) of the camera is operated, the taking lens (zoom lens) of the camera is driven according to the operation of the zoom lever so that the focal length can be set at a desired value. In connection with the taking lens, the cam followers 128 and 130 of the movable lenses 118 of the finder 120 move along the cam grooves of the cam member and the movable lenses 118 move along the optical axis within the range between the wide end and the telephoto end. Thereby, a subject image magnified by a photographing magnification can be seen through the finder 120.

If the main power switch is turned off after the photographing, the drive motor 152 is run to rotate the drive gear 154 clockwise in FIG. 10 and rotate the drive ring 156 counterclockwise (in a direction to close the cover). Consequently, the projecting piece 168 presses the lower slider 170 of the power transmission mechanism 158 downward, and accordingly, the upper slider 172 is pressed down by the force of the upper spring 176. In other words, the pin 182 moves downward to turn the lens cover 110 toward the covering position in FIG. 9. When the lens cover 110 reaches the covering position in FIG. 9, the drive motor 152 is stopped. Thus, the lens cover 110 protects the taking lens.

Figure 11:
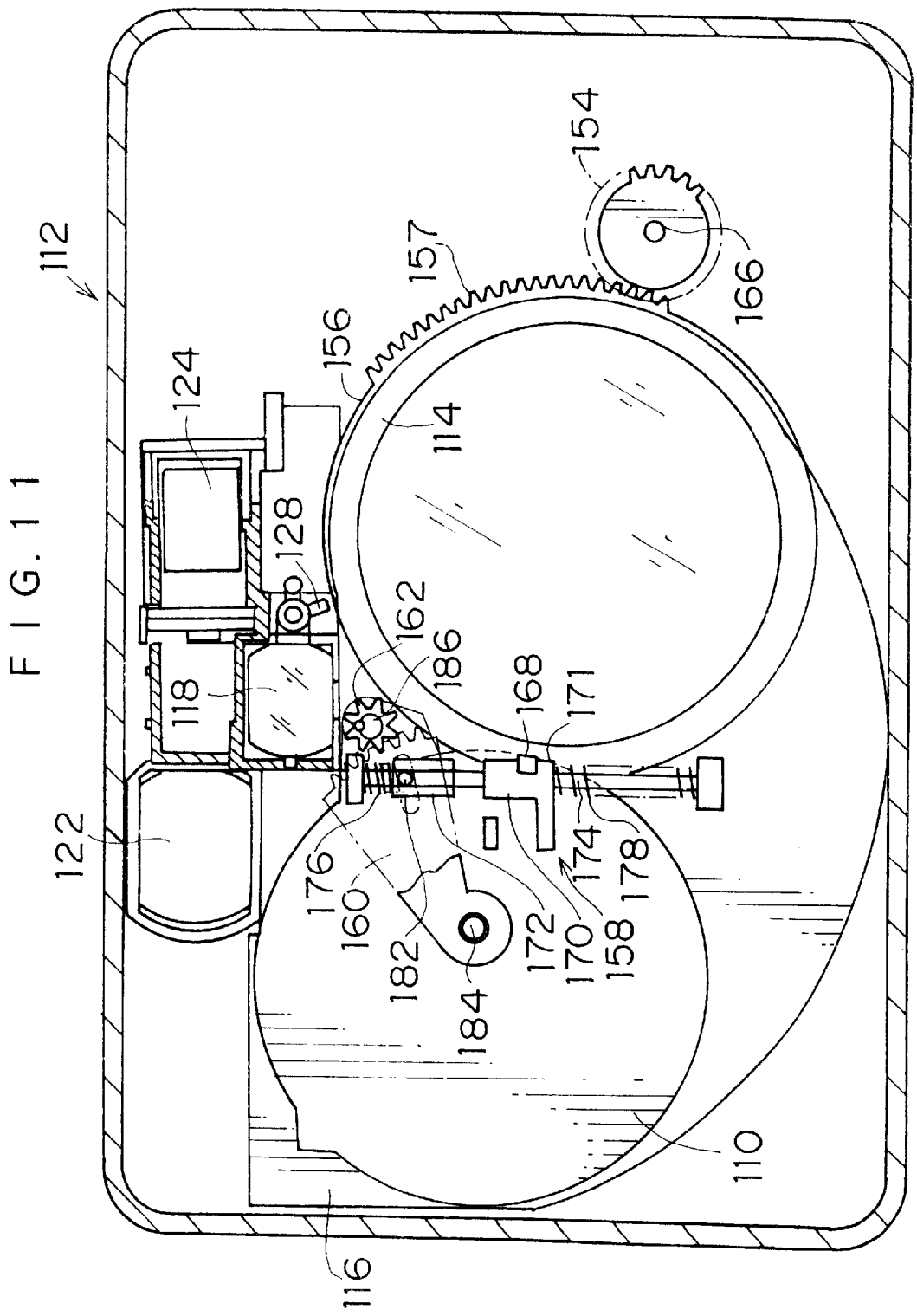
FIG. 11 is a front view showing the camera body when the lens cover is moved from the covering position to the uncovering position by an external force.

A description will now be given of the cushioning operation of the power transmission mechanism 158. First, a description will be given of the case where the lens cover 110 is moved from the covering position in FIG. 9 to the uncovering position in FIG. 11 by an external force applied in the direction to open the cover 110. The external force is transmitted from the lens cover 110 to the pin 182 through the pinion 162 and the sector gear 160. The external force transmitted to the pin 182 acts in a direction to push up the pin 182 to cause the upper slider 172 to be pushed up against the force of the upper spring 176. Thus, the external force is absorbed by the upward movement of the upper slider 172, and the external force is not transmitted to the drive system at the upstream from the drive ring 156. Thus, the drive system of the lens cover apparatus can be protected from the external force. If the external force disappears, the upper slider 172 is returned to the original position by the force of the upper spring 176, and the lens cover 110 returns to the original covering position in FIG. 9 in connection with the upper slider 172.

Figure 12:
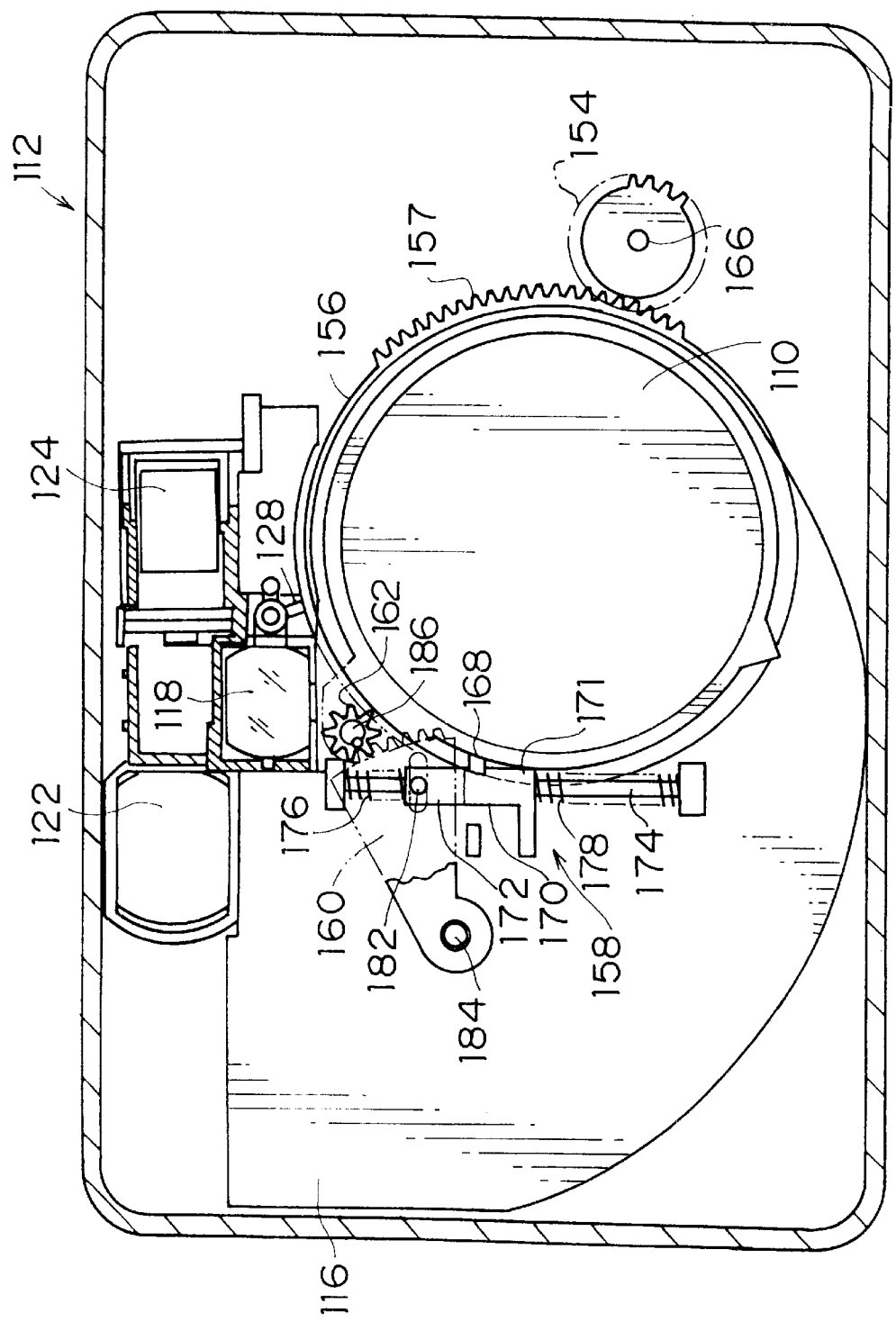
FIG. 12 is a front view showing the camera body when the lens cover is moved from the uncovering position to the covering position by an external force.

A description will be given of the case where the external force acts on the lens cover 110 at the uncovering position in FIG. 10 in such a manner as to move the lens cover 110 to the covering position in FIG. 12. The external force is transmitted from the lens cover 110 to the pin 182 through the pinion 162 and the sector gear 160. The external force transmitted to the pin 182 acts in a direction to push down the pin 182. Thus, the upper slider 172 is pushed down, and the lower slider 170 is pushed down against the force of the lower spring 178. At this time, the flange 171 of the lower slider 170 moves back from the projecting piece 168 of the drive ring 156, and thus, the external force is not transmitted to the drive system at the upstream from the drive ring 156. This prevents the lens cover apparatus from being damaged by the external force. If the external force disappears, the lower slider 170 and the upper slider 172 return to the original positions due to the force of the lower spring 178. The lens cover 110 also returns to the original uncovering position in FIG. 10 in connection with the movements of the lower slider 170 and the upper slider 172.

In this embodiment, the lens cover 110 is arranged between the camera body 112 and the casing 132, but the lens cover 110 may be attached to the front of the casing 132.

In this embodiment, the drive ring 156 is separate from the cam member for the finder 120, but the present invention should not be restricted to this. The drive ring 156 may be formed as a cylinder, which extends along the optical axis, and the cam grooves are formed on the peripheral surface of the drive ring 156 so that the drive ring 156 can also be used as the cam member for the finder 120.

FIG. 13 is a perspective view showing the state wherein a lens cover 210 and a lens cover driving mechanism of the lens cover apparatus according to the third embodiment of the present invention are installed in a camera body 212.

The camera body 212 is a box, which is long from side to side, and a fixed cylinder 214 of a lens barrel is provided almost at the center of the front of the camera body 212. The fixed cylinder 214 is formed unitedly with the camera body 212, or is formed separately from the camera body 212 and attached to the camera body 212. A film cartridge chamber 216 is defined at the left side of the fixed cylinder 214 in FIG. 13, and a finder 220 is provided above the fixed cylinder 214. The finder 220 has movable lenses 218 at the front of the camera body 212 and an eyepiece at the back of the camera body 212. Focusing windows 222 and 224 of an AF device are provided at sides of the movable lenses 218.

Figure 14:
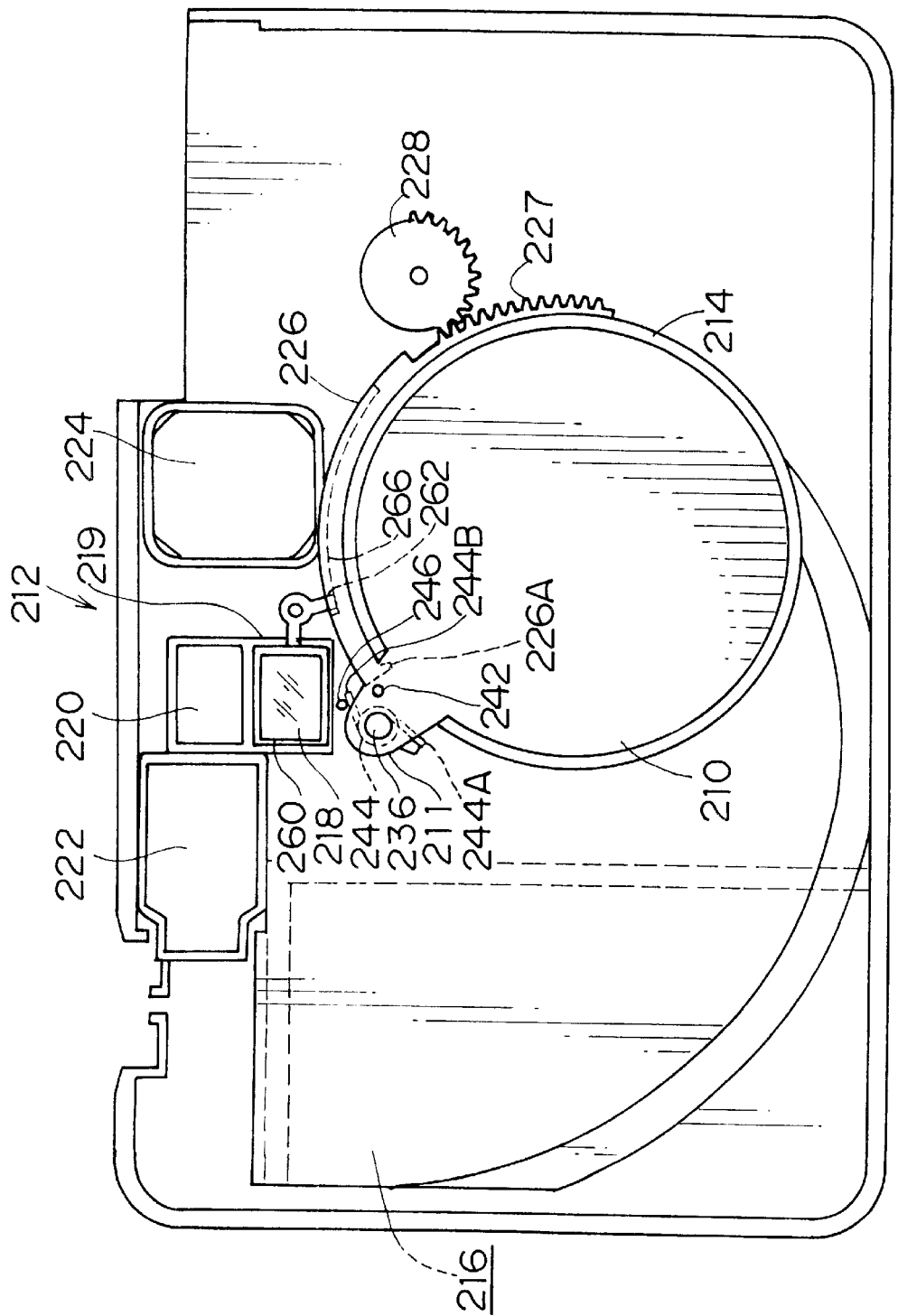
FIG. 14 is a front view showing a camera body when a lens cover is at the covering position.
Figure 15:
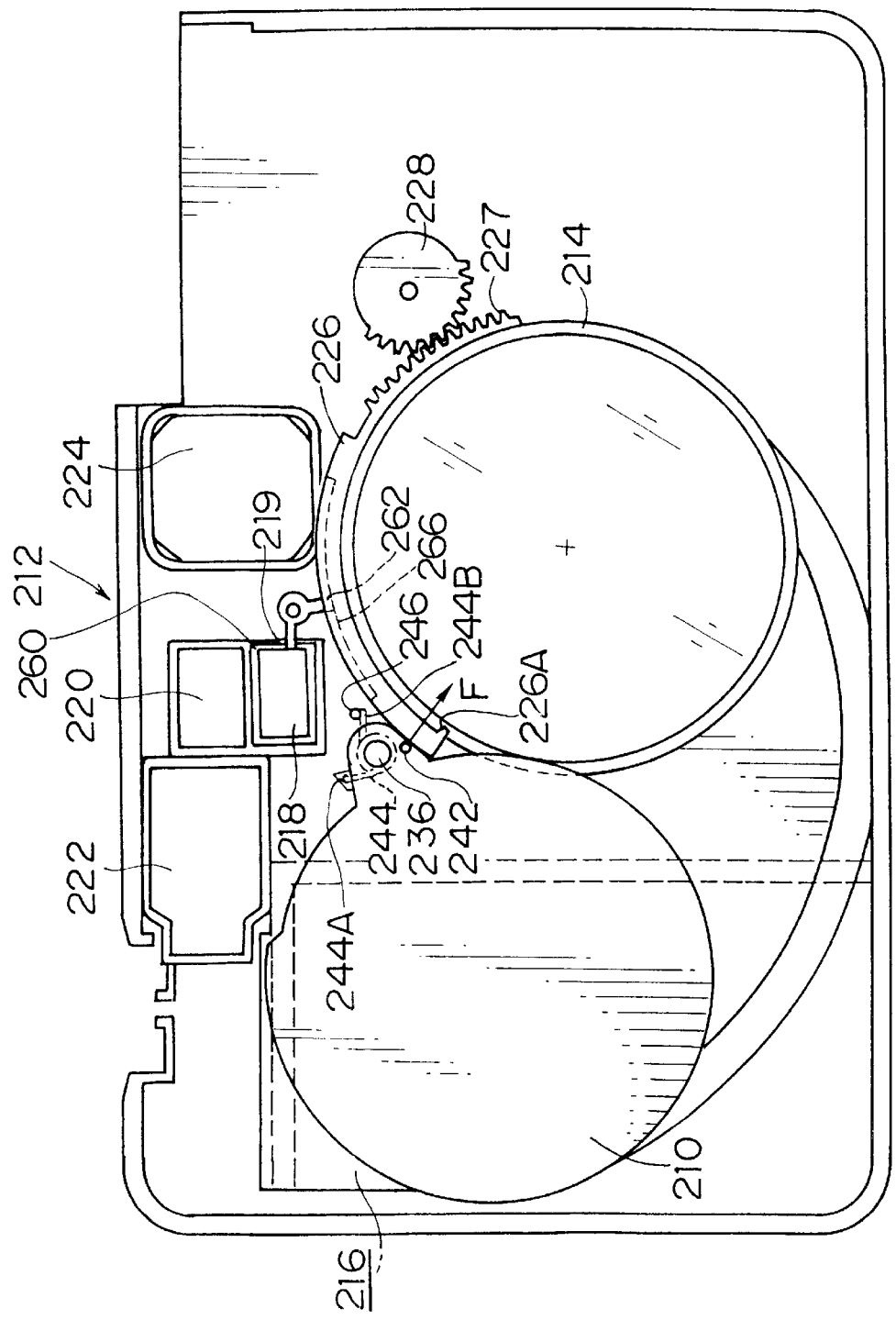
FIG. 15 is a front view showing the camera body when the lens cover is at the uncovering position.

The movable lenses 218 are composed of a front group and a rear group. The movable lenses 218 are arranged within a finder frame 219. As shown in FIGS. 14 and 15, the movable lenses 218 of the front and rear groups are held in movable lens holding frames 260. The movable lens 218 and the movable lens holding frame 260 of the rear group are not shown in FIGS. 13–15.

Cam followers 262 and 264 (indicated by alternate long and two short dashes lines in FIG. 16) project from the movable lens holding frames 260 of the front group and the rear group, respectively. The cam followers 262 and 264 are inserted into grooves 266 and 268, respectively, formed on a finder cam 226.

Figure 16:
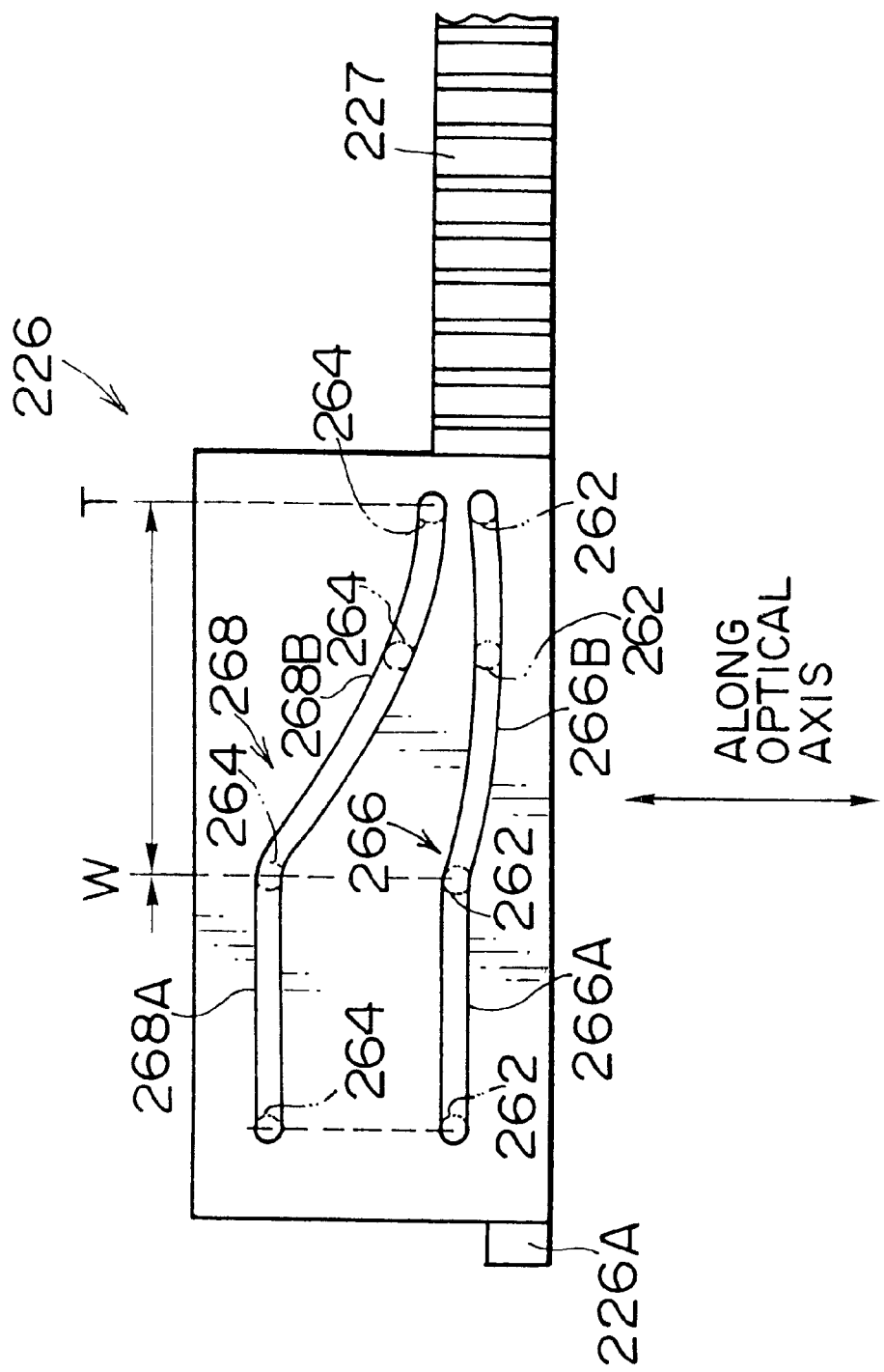
FIG. 16 is a development of a finder cam.

FIG. 16 is a development of the finder cam 226. As shown in FIG. 16, the grooves 266 and 268 on the finder cam 226 are composed of linear grooves 266A and 268A and curved cam grooves 266B and 268B, respectively. The linear grooves 266A and 268A are used to open and close the lens cover 210, and they are formed perpendicularly to the optical axis. Thus, the cam followers 262 and 264 do not move along the optical axis while the cam followers 262 and 264 are moving in the linear grooves 266A and 268A. In other words, the movable lens holding frames 260 of the front and rear groups do not move along the optical axis when the lens cover 210 is moved between the covering position and the uncovering position.

The cam grooves 266B and 268B are used to move the movable lens holding frames 260 forward and backward along the optical axis so that the image of the subject magnified by the photographic magnification can be seen through the zoom finder 220. Thus, the cam followers 262 and 264 move forward and backward along the cam grooves 266B and 268B and the movable lens holding frames 260 move forward and backward along the optical axis while the cam followers 262 and 264 are moving in the cam grooves 266B and 268B. The image of the subject magnified by the photographic magnification is seen through the zoom finder 220.

As shown in FIGS. 13–15, the finder cam 226 is an arc, which is slidably arranged on the circumference of the fixed cylinder 114. Teeth 227 are formed at the right half of the finder cam 226 in FIG. 13, and a drive gear 228 is engaged with the teeth 227. The drive gear 228 connects to a motor (not shown) through a reducing mechanism. Thus, running the motor to rotate the drive gear 228 counterclockwise/clockwise transmits the rotational force of the drive gear 228 to the finder cam 226, which rotates clockwise/counterclockwise along the circumference of the fixed cylinder 214. Consequently, the lens cover 210 is opened or closed, and the front and rear movable lens holding frames 260 move forward and backward in the cam grooves 266B and 268B along the optical axis.

A casing 250 is attached at the front of the camera body 212. The casing 250 has openings 254 and 252, which face to the fixed cylinder 214, the movable lenses 218 of the zoom finder 220 and the focusing windows 222 and 224. The opening 252 facing to the movable lenses 218 and the focusing windows 222 and 224 is opened even while the camera is unused. While the camera is unused, the opening 254 facing to the fixed cylinder 214 is closed by the lens cover 210 so that the lens cover 210 can protect the taking lens in the fixed cylinder 214.

A description will now be given of the mechanism for driving the lens cover 210. The driving mechanism for the lens cover 210 is comprised mainly of the finder cam 226, the drive gear 228 and the motor (not shown) for driving the drive gear 228. In short, the driving mechanism for the movable lens holding frames 260 of the zoom finder 220 is also used for driving the lens cover 210. Thus, in this embodiment, there is no necessity of providing a special driving mechanism for the lens cover 210, and this reduces the size and weight of the camera.

The lens cover 210 is disc-shaped so as to cover the front of the fixed cylinder 214 and close the opening 254 of the casing 250. A projecting piece 211 is formed at a part of the peripheral edge of the lens cover 210, and a pin 236 is attached to the projecting piece 211 as shown in FIG. 13. The pin 236 is fitted in a bearing 238, which projects from the fixed cylinder 214 of the camera body 212. Thus, the lens cover 210 turns with the pin 236 being a pivot between the covering position in FIG. 14 and the uncovering position in FIG. 15.

As shown in FIGS. 14 and 15, the bearing 238 is arranged in a space that is enclosed by the film cartridge chamber 216, the fixed cylinder 214 and the movable lenses 218 of the zoom finder 220. This enables the front of the film cartridge chamber 216 to be used as a recessed space for the lens cover 216 as shown in FIG. 15.

As shown in FIG. 13, a pin 242 projects from the projecting piece 211 of the lens cover 210. As shown in FIGS. 14 and 15, one end 244A of a torsion coil spring 244 mounted on the circumference of the bearing 238 connects to the pin 242, and the other end 244B of the torsion coil spring 244 is forced to connect to a pin 246 projecting from the front of the camera body 212. The force of the torsion coil spring 244 is transmitted to the lens cover 210 through the pin 242 and the projecting piece 211, and the camera body 212 holds the lens cover 210, which is always forced in the closing direction.

While the lens cover 210 is open, the torsion coil spring 244 presses the pin 242 against the circumference of a bent piece 226A of the finder cam 226 as shown in FIG. 15. The force, which is transmitted from the torsion coil spring 244 to the pin 242, is force F for pressing the finder cam 226 against the fixed cylinder 214. The force F regulates the rotation of the finder cam 226 with respect to the fixed cylinder 214.

While the lens cover 210 is closed, the pin 242 is in contact with the bent piece 226A of the drive ring 226 as shown in FIG. 14. When the finder cam 226 is rotated counterclockwise in FIG. 14, the pin 242 is pressed by the bent piece 226A and the lens cover 10 is turned clockwise with the pin 236 being a pivot. When the pin 242 moves onto the elastic piece 226B and turns by a predetermined angle, the lens cover 210 is at the uncovering position in FIG. 15. Consequently, the opening 254 of the casing 250 in FIG. 13 is completely opened. In other words, the rotational force of the finder cam 226 drives the lens cover 210, which opens the opening 254. The process of closing the lens cover 210 is reversed from the process of opening it.

A description will now be given of the operation of the lens cover apparatus according to the third embodiment of the present invention.

If a main power switch of the camera is OFF, the lens cover 210 is located at the covering position in FIG. 14. In other words, the lens cover 210 protects the taking lens while the camera is unused.

If the main power switch is turned on in FIG. 14, the motor is run to rotate the drive gear 228 clockwise. Consequently, the finder cam 226 rotates counterclockwise in FIG. 14 and the lens cover 210 turns toward the uncovering position in FIG. 15. When the pin 242 moves onto the bent piece 226A and turns by the predetermined angle, the lens cover 210 reaches the uncovering position in FIG. 15. This completely opens the opening 254 of the casing 250 to enable the photographing by the camera. When the lens cover 210 reaches the position in FIG. 15, the motor stops. Since the cam followers 262 and 264 of the front and rear movable lens holding frames 260 move in the linear grooves 266A and 268A of the finder cam 226, the front and rear movable lens holding frames 260 do not move forward and backward along the optical axis.

If the photographing is started in the state shown in FIG. 15 and a zoom lever (not shown) of the camera is operated, the taking lens (zoom lens) of the camera is driven according to the operation of the zoom lever so that the focal length can be set at a desired value. The drive gear 228 is driven in connection with the movement of the taking lens. If the drive gear 228 is rotated clockwise from the state in FIG. 15, the cam followers 262 and 264 move to the right relatively in FIG. 16 along the cam grooves 266B and 268B, so that the front and rear movable lens holding frames 260 move from the wide end to the telephoto end. Thereby, the image of the object magnified by a photographic magnification can be seen through the finder 120. If the drive gear 228 is rotated counterclockwise, the front and rear movable lens holding frames 260 move from the telephoto end to the wide end.

When the main power switch is turned off after the photographing, the motor is run to rotate the drive gear 228 counterclockwise in FIG. 15. Consequently, the finder cam 226 rotates clockwise. When the pin 252 is released from the bent piece 226A of the finder cam 226, the lens cover 210 is positioned at the covering position in FIG. 14 and the motor stops. Therefore, the lens cover 210 completely closes the opening 254 of the casing 250 to make impossible the photographing by the camera.

The motor for driving the drive gear 228 may be provided independently of a motor for zooming the taking lens, but it is preferable to use one motor for driving the gear 228 and zooming the taking lens in order to reduce the number of parts for the camera. In this embodiment, the lens cover 210 is arranged between the camera body 212 and the casing 250, but the lens cover 210 may be attached to the front of the casing 250.

According to the lens cover apparatus of this embodiment, the finder cam 226 for moving the movable lens holding frames 260 of the zoom finder 220 connects to the lens cover 210 so that the power can be transmitted from the finder cam 226 to the lens cover 216. The driving force of the finder cam 226 opens and closes the lens cover 210. This eliminates the necessity of providing a special driving mechanism for the lens cover 210 and reduces the size and weight of the camera.

Figure 17:
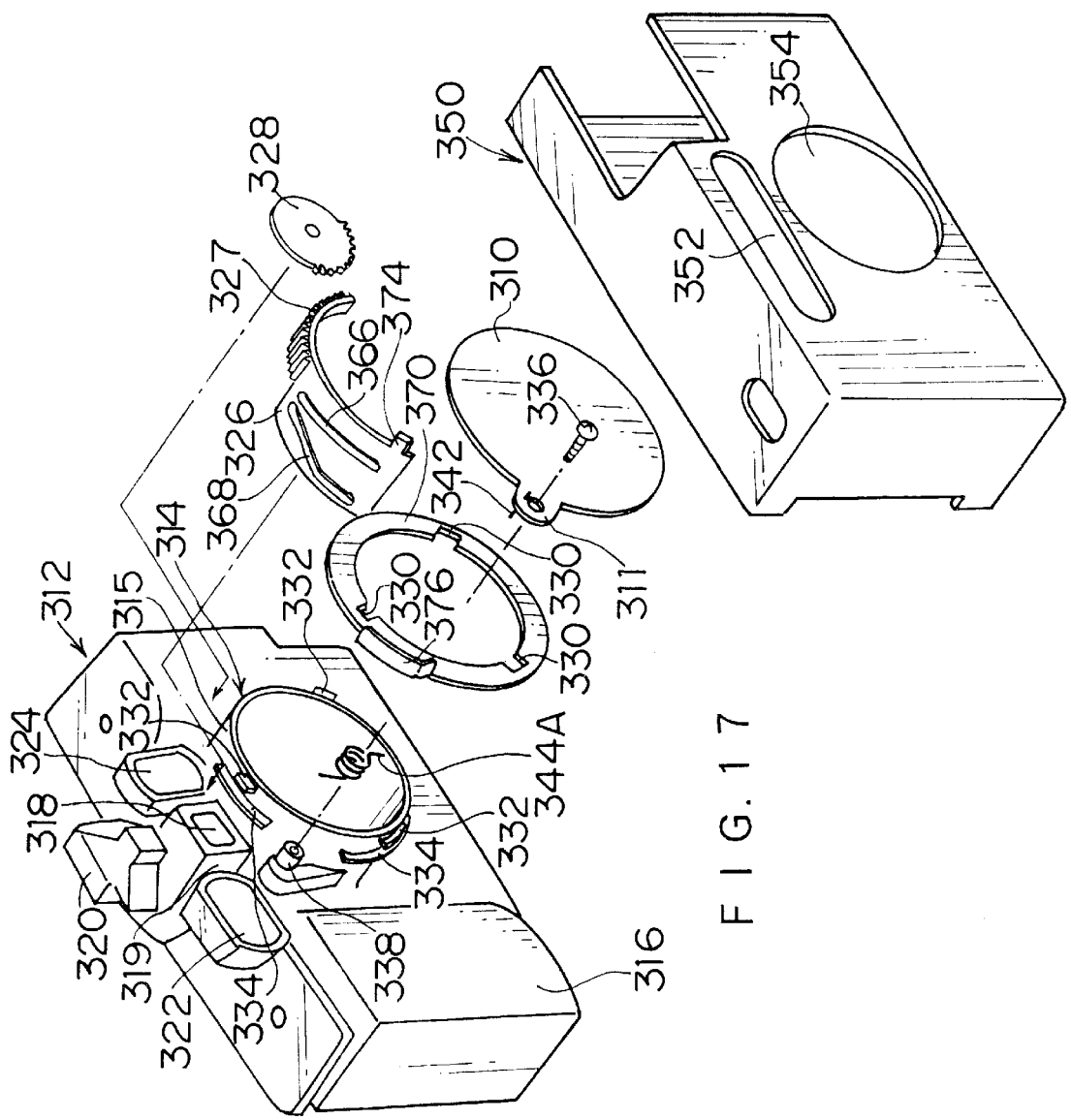
FIG. 17 is an exploded perspective view showing a lens cover apparatus according to the fourth embodiment of the present invention.

FIG. 17 is a perspective view showing the state wherein a lens cover 310 of a lens cover apparatus and a driving mechanism therefor according to the fourth embodiment of the present invention are attached to a camera body 312.

A film cartridge chamber 316 is defined at the left side of a fixed cylinder 314 of the camera body 312 in FIG. 17. A zoom finder 320 is provided above the fixed cylinder, and the zoom finder 320 has movable lenses 318 at the front of the camera body 312 and an eyepiece at the rear of the camera body 312. Focusing windows 322 and 324 of an AF device are provided at sides of the movable lenses 318.

Figure 18:
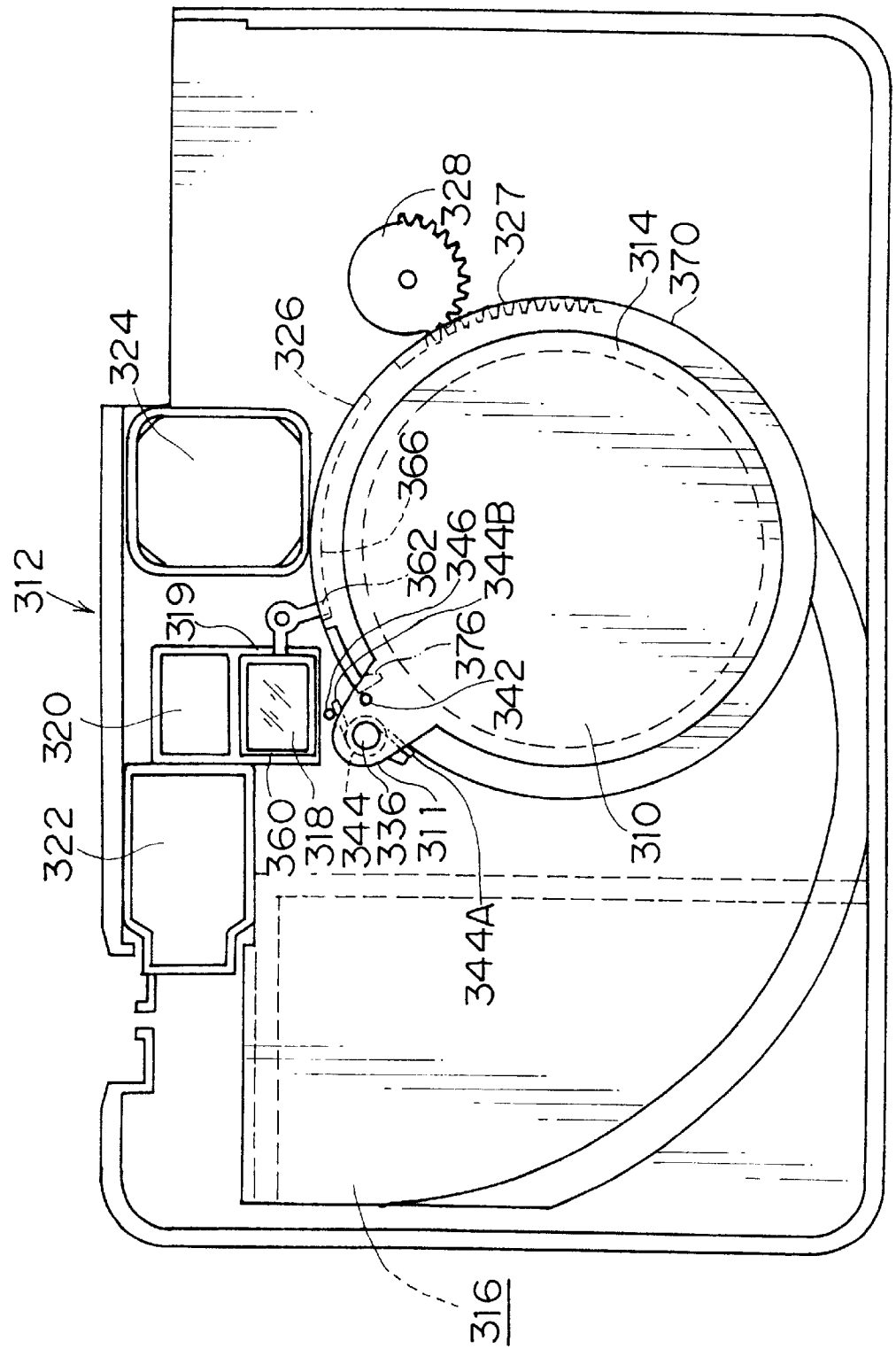
FIG. 18 is a front view showing a camera body when a lens cover is at the covering position.
Figure 19:
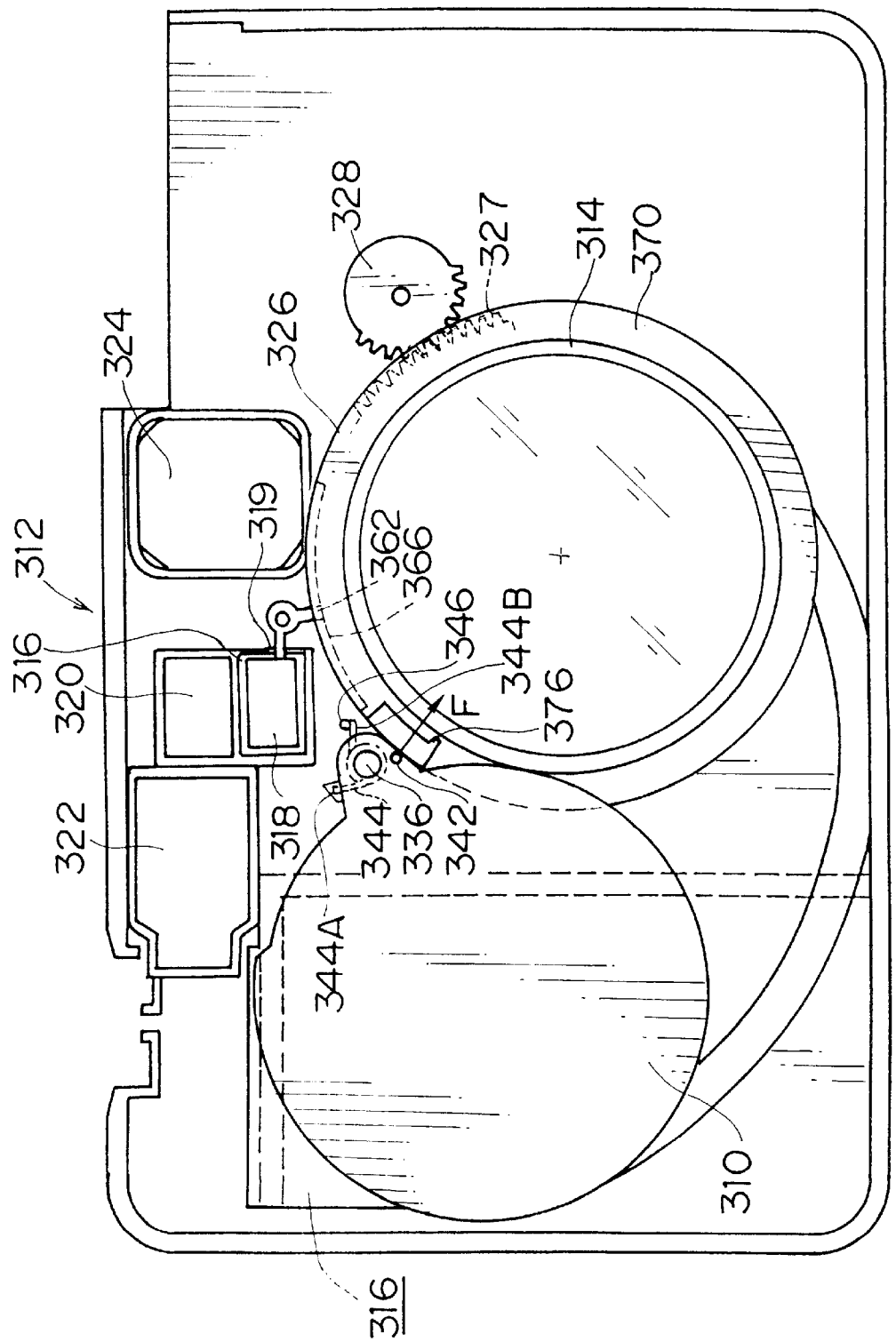
FIG. 19 is a front view showing the camera body when the lens cover is at the uncovering position.

The movable lenses 318 are composed of a front group and a rear group. The movable lenses 318 are arranged within a finder frame 319. As shown in FIGS. 18 and 19, the movable lenses 318 of the front and rear groups are held in lens holding frames 360. The movable lens 318 and the movable lens holding frame 360 of the rear group are not shown in FIGS. 17–19.

Cam followers 362 and 364 (indicated by alternate long and two short dashes lines in FIG. 20) project from the lens holding frames 360 of the front and rear groups, respectively. The cam followers 362 and 364 are inserted into cam grooves 366 and 368, respectively, formed on a finder cam 326.

Figure 20:
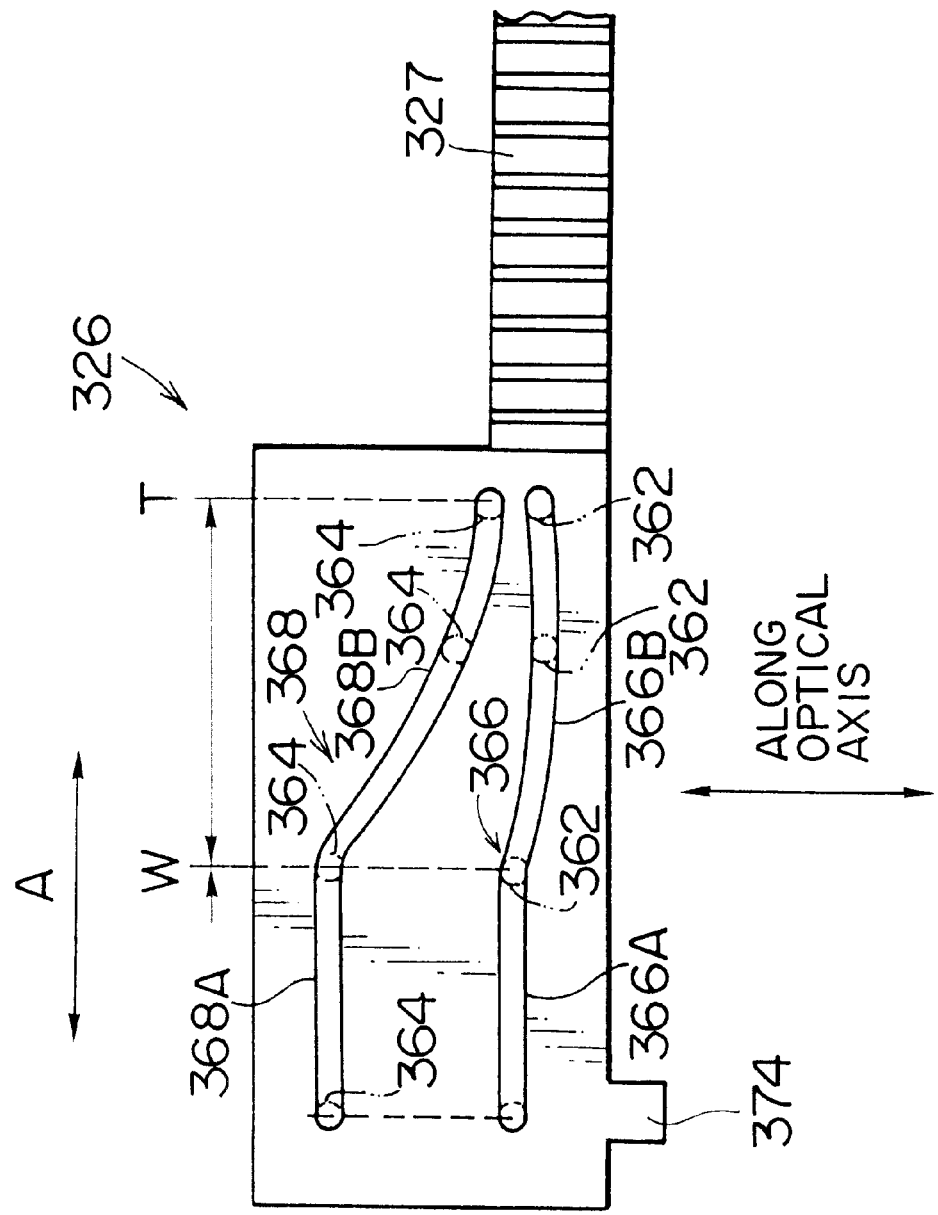
FIG. 20 is a development of a finder cam.
Figure 21:
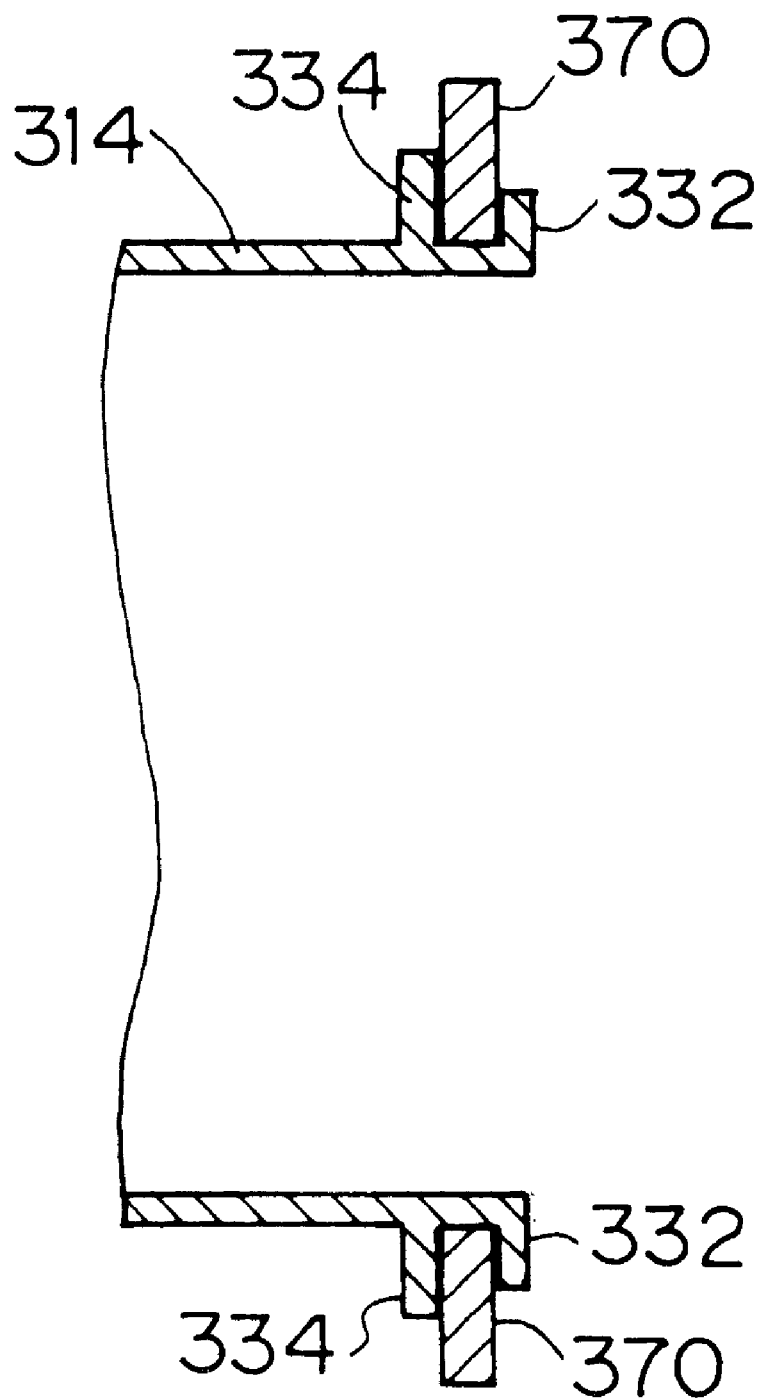
FIG. 21 is a longitudinal sectional view showing a fixed cylinder on which a cover drive ring is mounted.

FIG. 20 is a development of the finder cam 326. As shown in FIG. 20, the grooves 366 and 368 on the finder cam 326 are composed of linear grooves 366A and 368A and curved cam grooves 366B and 368B. The linear grooves 366A and 368A are used to open and close the lens cover 310, and they are formed perpendicularly to the optical axis. The finder cam 326 is driven in a direction indicated by an arrow A, that is, in the direction perpendicularly to the optical axis. Thus, the cam followers 362 and 364 do not move along the optical axis while the cam followers 362 and 364 are moving in the linear grooves 366A and 368A. In other words, the movable lens holding frames 360 of the front and rear groups do not move along the optical axis when the lens cover 310 is closed or opened.

The cam grooves 366B and 368B are used to move the movable lens holding frames 360 forward and backward along the optical axis so that the image of the subject magnified by the photographic magnification can be seen through the zoom finder 320. Thus, the cam followers 362 and 364 move forward and backward along the cam grooves 366B and 368B and the front and rear movable lens holding frames 360 move forward and backward along the optical axis while the cam followers 362 and 364 move in the cam grooves 366B and 368B. The image of the subject magnified by the photographic magnification is seen through the zoom finder 320.

As shown in FIGS. 17–19, the finder cam 326 is an arc, which is slidably arranged on the circumference 315 of the fixed cylinder 314. Teeth 327 are formed at the right half of the finder cam 326 in FIG. 17, and a drive gear 328 is engaged with the teeth 327. The drive gear 328 connects to a motor (not shown) through a reducing mechanism. Thus, running the motor to rotate the drive gear 328 counterclockwise/clockwise transmits the rotational force of the drive gear 328 to the finder cam 326, which rotates clockwise/counterclockwise along the circumference of the fixed cylinder 314. Consequently, the lens cover 310 is opened or closed, and the front and rear movable lens holding frames 360 move forward and backward in the cam grooves 366B and 368B along the optical axis.

A casing 350 is attached at the front of the camera body 312. The casing 350 has openings 354 and 352, which face to the fixed cylinder 314, the movable lenses 318 of the finder 320 and the focusing windows 322 and 324. The opening 352 facing to the movable lenses 318 and the focusing windows 322 and 324 is opened even while the camera is unused. While the camera is unused, the opening 354 facing to the fixed cylinder 314 is closed by the lens cover 310 so that the lens cover 310 can protect the taking lens in the fixed cylinder 314.

A description will now be given of the lens cover 310 and a driving mechanism therefor. The driving mechanism has a cover drive ring 370 but has no special drive motor for the lens cover 310.

As shown in FIG. 17, the cover drive ring 370 is mounted on an outer peripheral surface 315 of the fixed cylinder 314 in such a manner as to freely rotate along the circumference of the fixed cylinder 314. Three chips 330 are formed at regular intervals at the inner circumference of the cover drive ring 370. Correspondingly to the three chips 330, three projections 332 are formed at the regular intervals on the outer peripheral surface 315 of the fixed cylinder 314, and three guides 334 are formed at the rear of the projections 332. The cover drive ring 370 is mounted on the outer peripheral surface 315 of the fixed cylinder 314 in the state wherein the chips 330 are joined with the projections 332. If the cover drive ring 370 rotates by a predetermined angle so as to separate the chips 330 from the projections 332, the cover drive ring 370 rotates in the state of being pinched between the projections 332 and the guides 334. Thereby, the drive ring 326 can stably rotate without coming off the fixed cylinder 314.

Figure 22:
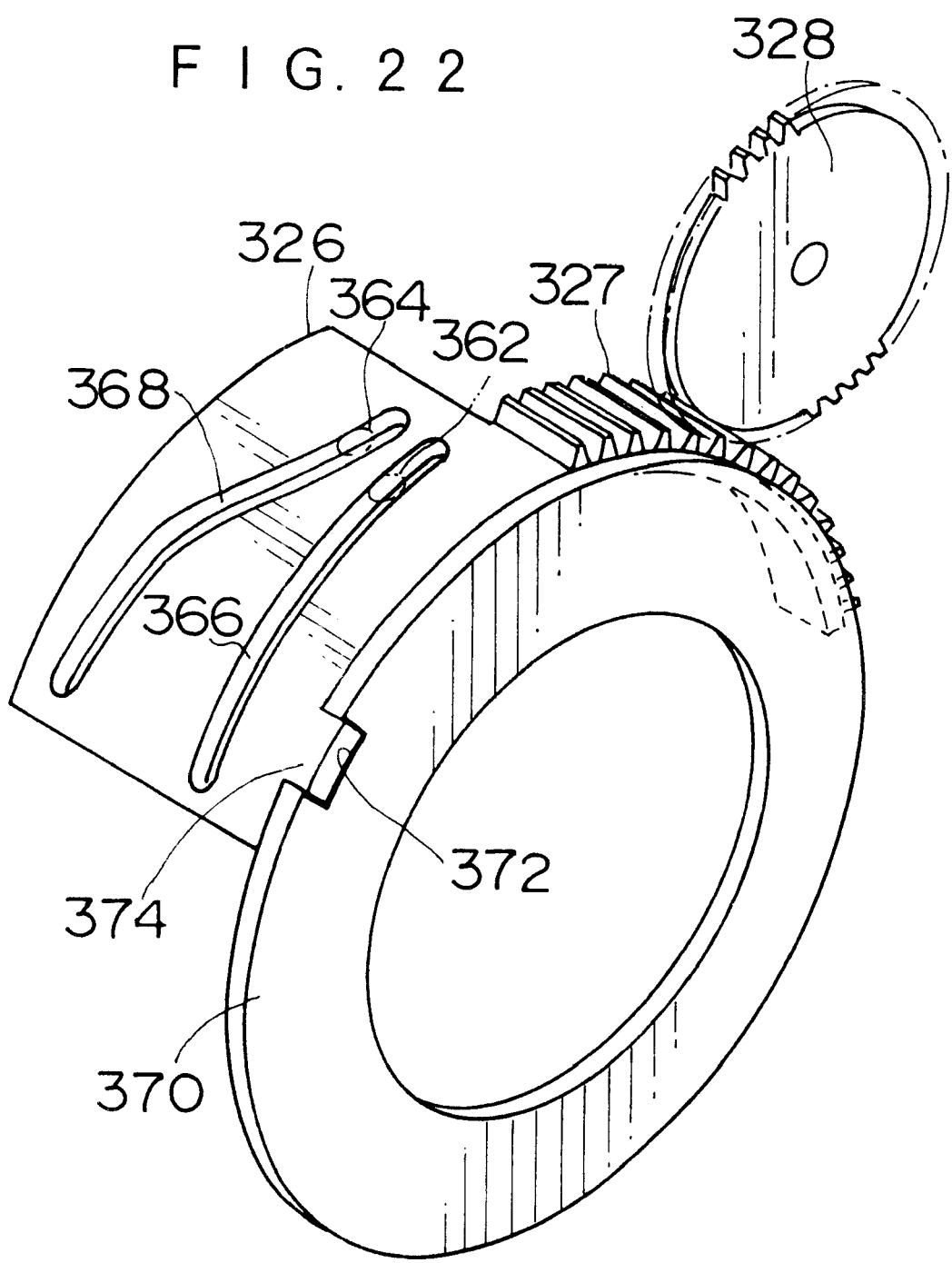
FIG. 22 is a perspective view showing the essential parts of an embodiment in which the finder cam drives the cover drive ring.

As shown in FIG. 22, a recession 372 is formed at a part of the outer peripheral surface of the cover drive ring 370. A projecting part 374 formed on the finder cam 326 is fitted in the recession 372 so that the finder cam 326 can connect to the cover drive ring 370. Thus, the finder cam 326 drives the cover drive ring 370 to open and close the lens cover 310.

The lens cover 310 is disc-shaped in such a manner as to cover the front of the cylindrical fixed cylinder 314 and close the opening 354 of the casing 350. A projecting piece 311 is formed at a part of the peripheral edge of the lens cover 310, and a pin 336 is mounted in the projecting piece 311 as shown in FIG. 17. The pin 336 is inserted into a bearing 338, which projects from the fixed cylinder 314 of the camera body 312. The lens cover 310 turns with the bearing 336 being a pivot between the covering position in FIG. 18 and the uncovering position in FIG. 19.

As shown in FIGS. 18 and 19, the bearing 338 is provided in a space that is enclosed by the film cartridge chamber 316, the fixed cylinder 314 and the movable lenses 318 of the zoom finder 320. If the bearing 338 is provided in the space, the front of the film cartridge chamber 316 can be used as a recessed space for the lens cover 310 as shown in FIG. 19.

As shown in FIG. 17, a pin 342 projects from the projecting piece 311 of Athe lens cover 310. As shown in FIGS. 18 and 19, one end 344A of a torsion coil spring 344 mounted on the circumference of the bearing 338 connects to the pin 342, and the other end 344B of the torsion coil spring 344 is forced and connected to a pin 346 projecting from the front of the camera body 312. The force of the torsion coil spring 344 is transmitted to the lens cover 310 through the pin 342 and the projecting piece 311, and the camera body 312 holds the lens cover 310, which is always forced in the closing direction.

While the lens cover 310 is open, the torsion coil spring 344 presses the pin 342 against the circumference of a bent piece 376 of the cover drive ring 370 as shown in FIG. 19. The force, which is transmitted from the torsion coil spring 344 to the pin 342, is a force F for pressing the cover drive ring 370 against the fixed cylinder 314. The force F regulates the rotation of the cover drive ring 370 with respect to the fixed cylinder 314.

While the lens cover 310 is closed, the pin 342 is in contact with the end of the bent piece 376 of the cover drive ring 370 as shown in FIG. 18. If the cover drive ring 370 is rotated counterclockwise in FIG. 18 by the finder cam 326, the pin 342 is pressed by the end of the bent piece 376. Consequently, the lens cover 310 turns clockwise with the pin 316 being a pivot. When the pin 342 moves onto the bent piece 376 and turns by a predetermined angle, the lens cover 310 reaches the uncovering position in FIG. 19. The opening 354 of the casing 350 shown in FIG. 17 is completely opened. In other words, the rotational force of the finder cam 326 drives the lens cover 310 to open the opening 354. The process of closing the opening 354 is reversed from the process of opening it.

A description will now be given of the operation of the lens cover apparatus according to the fourth embodiment of the present invention.

If a main power switch of the camera is OFF, the lens cover 310 is located at the covering position in FIG. 18. In other words, the lens cover 310 protects the taking lens while the camera is unused.

When the main power switch is turned on in FIG. 18, the motor is run to rotate the drive gear 328 clockwise and rotates the finder cam 326 counterclockwise in FIG. 18. Consequently, the cover drive ring 370 rotates counterclockwise in connection with the finder cam 326. Therefore, the lens cover 310 turns toward the uncovering position in FIG. 19. When the pin 342 moves onto the bent piece 376 and turns by the predetermined angle, the lens cover 310 reaches the uncovering position in FIG. 19. This completely opens the opening 354 of the casing 350 to enable the photographing by the camera. When the lens cover 310 reaches the uncovering position in FIG. 19, the motor stops. Since the cam followers 362, 364 of the front and rear movable lens holding frames 360 move in the linear grooves 366A, 368A of the finder cam 326, the front and rear movable lens holding frames 360 do not move forward and backward along the optical axis.

If the photographing is started in FIG. 19 and a zoom lever (not shown) of the camera is operated, the taking lens (zoom lens) of the camera is driven according to the operation of the zoom lever so that the focal length can be set at a desired value. The drive gear 328 is driven in connection with the movement of the taking lens. If the drive gear 328 is rotated clockwise from the state in FIG. 19, the cam followers 362 and 364 move to the right relatively in FIG. 20 along the cam grooves 366B and 368B, so that the front and rear movable lens holding frames 360 move from the wide end to the telephoto end. Thereby, the image of the subject magnified by a photographic magnification can be seen through the zoom finder 320. If the drive gear 328 is rotated in the opposite direction, the front and rear movable lens holding frames 360 move from the telephoto end to the wide end.

When the main power switch is turned off after the photographing, the motor runs to rotate the drive gear 328 counterclockwise in FIG. 19. Consequently, the finder cam 326 rotates clockwise, and the cover drive ring 370 also rotates clockwise in connection with the finder cam 326. When the pin 342 is released from the bent piece 376 of the cover drive ring 370, the lens cover 310 reaches at the covering position in FIG. 18 and the motor stops. Therefore, the lens cover 310 completely closes the opening 354 of the casing 350 to make impossible the photographing by the camera.

According to the lens cover apparatus of this embodiment, the cover drive ring 370 for driving the lens cover 310 connects to the finder cam 326 for driving the movable lens holding frames 360, so that the driving force of the finder cam 326 can drive the movable lens holding frames 360 and the lens cover 310. Therefore, one drive motor is able to drive the movable lens holding frames 360 and the lens cover 310. This reduces the size and weight of the camera.

In this embodiment, the drive gear 328 connects to the finder cam 326, which transmits the driving force to the cover drive ring 370. The present invention, however, should not be restricted to this. More specifically, teeth 378 may be formed on a cover drive ring 370A as shown in FIG. 23, and the drive gear 328 may be engaged with the teeth 378 so that the driving force can be transmitted from the cover drive ring 370A to a finder cam 326A. In this case, one drive motor can be used for driving the movable lens holding frames 360 and the lens cover 310. In FIG. 23, the finder cam 326A connects to the cover drive ring 370A in such a manner that a projecting part 372A of the cover drive ring 370A is fitted in a recession 374A formed on the finder cam 326A.

In this embodiment, it is possible to separately provide the motor for driving the drive gear 328 and the motor for zooming the taking lens, but it is more preferable to use one motor for driving the drive gear 328 and zooming the taking lens in order to reduce the number of parts for the camera. In this embodiment, the lens cover 310 is arranged between the camera body 312 and the casing 350, but the lens cover 310 may be attached to the front of the casing 350.

As set forth hereinabove, the pivot of the lens cover is arranged in the space enclosed by the film cartridge chamber, the fixed cylinder and the finder or in the space enclosed by the film cartridge chamber, the fixed cy linder and the gear train in the camera body. The camera can be small since front of the film cartridge chamber is used as the recessed space for the lens cover.

Moreover, the projecting part is formed on the outer peripheral surface of the fixed cylinder of the camera body on which the drive ring is rotatably supported. The projecting part enables the insertion of the drive ring and prevents the drive ring from coming off. This eliminates the necessity of separately providing a member for preventing the drive ring from coming off, and decreases the number of parts for the camera and reduces the thickness of the camera.

Furthermore, the power transmission mechanism is arranged in the conventionally-unused recession between the fixed cylinder and the film cartridge chamber of the camera body, and this reduces the size of the camera. Furthermore, the camera can be small since the power transmission mechanism is the rectilinear motion mechanism.

In addition, the lens cover and the cam member for moving the movable lens holding frames of the finder are operatively connected to each other, so that the driving force of the cam member can open and close the lens cover. This eliminates the necessity of providing a special mechanism for driving the lens cover, and reduces the size and weight of the camera. Moreover, one drive motor is used to drive both the lens cover and the movable lens holding frames of the finder, and this reduces the size and weight of the camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:
a camera body having a fixed cylinder of a lens barrel, a film cartridge chamber at a side of the fixed cylinder, and a finder above the fixed cylinder;
a casing attached to the front of the camera body, the casing having an opening facing the fixed cylinder; and
a lens cover arranged between the camera body and the casing, the lens cover having a pivot in a space enclosed by the film cartridge chamber, the fixed cylinder and the finder of the camera body, the lens cover turning on the pivot to open and close the opening of the casing.

2. The camera as defined in claim 1, further comprising:
a motor provided in the camera body; and
a drive ring rotatably arranged on an outer peripheral surface of the fixed cylinder of the camera body, the drive ring transmitting a rotational force of the motor to the lens cover.

3. The camera as defined in claim 2, wherein the drive ring has teeth on the outer peripheral surface thereof, the teeth being engaged with a gear operatively connected to the motor.

4. The camera as defined in claim 3, further comprising:
a power transmission member which connects the drive ring and the lens cover; and
a forcing member which applies a pressing force to the power transmission member to thereby press the drive ring against the outer peripheral surface of the fixed cylinder.

5. A camera comprising:
a camera body having a fixed cylinder of a lens barrel, a film cartridge chamber at a side of the fixed cylinder and a gear train below the fixed cylinder;
a casing attached to the front of the camera body, the casing having an opening facing the fixed cylinder; and
a lens cover arranged between the camera body and the casing, the lens cover having a pivot in a space enclosed by the film cartridge chamber, the fixed cylinder and the gear train of the camera body, the lens cover turning on the pivot to open and close the opening of the casing.

6. The camera as defined in claim 5, further comprising:
a motor provided in the camera body; and
a drive ring rotatably arranged on an outer peripheral surface of the fixed cylinder of the camera body, the drive ring transmitting a rotational force of the motor to the lens cover.

7. The camera as defined in claim 6, wherein the drive ring has teeth on the outer peripheral surface thereof, the teeth being engaged with a gear operatively connected to the motor.

8. The camera as defined in claim 7, further comprising:
a power transmission member which connects the drive ring to the lens cover; and
a forcing member which applies a pressing force to the power transmission member to thereby press the drive ring against the outer peripheral surface of the fixed cylinder.

9. A camera comprising:
a camera body having a fixed cylinder of a lens barrel, the fixed cylinder having a projecting part on the outer peripheral surface thereof;
a casing attached to the front of the camera body, the casing having an opening facing the fixed cylinder;
a lens cover arranged between the camera body and the casing, the lens cover being turned to open and close the opening of the casing;
a motor provided in the camera body; and
a drive ring rotatably arranged on the outer peripheral surface of the fixed cylinder of the camera body, the drive ring having a chip at the inner circumference thereof, the projecting part being able to pass through the chip, the drive ring transmitting a rotational force of the motor to the lens cover;
wherein the drive ring is mounted on the outer peripheral surface of the fixed cylinder with the chip being joined with the projecting part and is rotated by a predetermined amount to thereby prevent the drive ring from coming off the fixed cylinder.

10. A camera, compnsing:
a camera body having a fixed cylinder of a lens barrel and a film cartridge chamber;
a casing attached to the front of the camera body, the casing having an opening facing the fixed cylinder;
a lens cover which opens and closes the opening of the casing;

a motor provided in the camera body; and a power transmission mechanism which transmits power of the motor to the lens cover, the power transmission mechanism not transmitting an external force, applied to the lens cover, to the motor, the power transmission mechanism being arranged in a recession formed between the fixed cylinder and the film cartridge chamber of the camera body.

11. The camera as defined in claim 10, wherein the power transmission mechanism converts a rotary motion of the motor to a rectilinear motion and transmits the rectilinear motion to the lens cover, the lengthwise direction of the power transmission mechanism being parallel to the lengthwise direction of the recession.

12. A camera comprising:

a camera body having a fixed cylinder of a lens barrel and a finder frame;

a casing attached to the front of the camera body, the casing having an opening facing the fixed cylinder;

a lens cover which opens and closes the opening of the casing;

a movable lens holding frame arranged in the finder frame of the camera body, the movable lens holding frame being movable forward and backward, the movable lens holding frame holding a movable lens of a finder; and a cam member which moves the movable lens holding frame forward and backward;

wherein the lens cover is opened and closed by a driving force of the cam member.

13. A camera comprising:

a camera body having a fixed cylinder of a lens barrel and a finder frame;

a casing attached to the front of the camera body, the casing having an opening facing the fixed cylinder;

a lens cover for opening and closing the opening of the casing;

a drive member for opening and closing the lens cover;

a movable lens holding frame arranged in the finder frame of the camera body, the movable lens holding frame being movable forward and backward, the movable lens holding frame holding a movable lens of a finder; and a cam member which moves the movable lens holding frame forward and backward;

wherein the drive member connects and the cam member connect to one another, both the lens cover and the movable lens holding frame being driven by a driving force applied to either one of the drive member and the cam member.

* * * * *